(12) United States Patent
Parvulescu et al.

(10) Patent No.: US 11,155,467 B2
(45) Date of Patent: Oct. 26, 2021

(54) SOLIDOTHERMAL SYNTHESIS OF A BORON-CONTAINING ZEOLITE WITH AN MWW FRAMEWORK STRUCTURE

(71) Applicant: BASF SE, Ludwigshafen am Rhein (DE)

(72) Inventors: Andrei-Nicolae Parvulescu, Ludwigshafen (DE); Ulrich Mueller, Ludwigshafen (DE); Stefan Maurer, Shanghai (CN); Yu Dai, Shanghai (CN); Feng-Shou Xiao, Hangzhou (CN); Xiangju Meng, Hangzhou (CN); Yeqing Wang, Hangzhou (CN)

(73) Assignee: BASF SE

( * ) Notice: Subject to any disclaimer, the term of this patent is extended or adjusted under 35 U.S.C. 154(b) by 143 days.

(21) Appl. No.: 16/330,592

(22) PCT Filed: Sep. 5, 2017

(86) PCT No.: PCT/EP2017/072200
§ 371 (c)(1),
(2) Date: Mar. 5, 2019

(87) PCT Pub. No.: WO2018/046481
PCT Pub. Date: Mar. 15, 2018

(65) Prior Publication Data
US 2020/0339430 A1 Oct. 29, 2020

(30) Foreign Application Priority Data
Sep. 6, 2016 (WO) ................ PCT/CN2016/098177

(51) Int. Cl.
*C01B 37/00* (2006.01)
*B01J 20/10* (2006.01)
(Continued)

(52) U.S. Cl.
CPC ............. *C01B 37/007* (2013.01); *B01J 20/10* (2013.01); *B01J 20/305* (2013.01);
(Continued)

(58) Field of Classification Search
CPC ....... C01B 39/12; C01B 39/48; C01B 37/007; B01J 20/18; B01J 20/3078; B01J 29/86;
(Continued)

(56) References Cited

U.S. PATENT DOCUMENTS 4,954,325 A 9/1990 Rubin et al.
4,992,615 A 2/1991 Huss, Jr. et al.
(Continued)

FOREIGN PATENT DOCUMENTS

CN 104591203 A 5/2015
WO WO 2014/086300 A1 6/2014
(Continued)

OTHER PUBLICATIONS

Xu etal,"A Novel Method of Preparation of Zeolite ZSM-5", J. Chem. Soc., Chem. Comm. (1990) pp. 755-756 (Year: 1990).*
(Continued)

*Primary Examiner* — David M Brunsman
(74) *Attorney, Agent, or Firm* — Faegre Drinker Biddle & Reath LLP

(57) ABSTRACT

Described herein is a process for producing a zeolitic material having an MWW framework structure containing $YO_2$ and $B_2O_3$, in which Y stands for a tetravalent element. The process includes the steps of (i) preparing a mixture containing one or more sources for $YO_2$, one or more sources for $B_2O_3$, one or more organotemplates, and seed crystals, (ii) crystallizing the mixture obtained in (i) for obtaining a layered precursor of the MWW framework structure, and (iii) calcining the layered precursor obtained in (ii) for obtaining the zeolitic material having an MWW
(Continued)

framework structure. Also disclosed herein are synthetic boron-containing zeolites obtain by the process and uses thereof.

14 Claims, 6 Drawing Sheets

(51) Int. Cl.
| | |
|---|---|
| B01J 29/70 | (2006.01) |
| B01J 29/86 | (2006.01) |
| B01J 37/08 | (2006.01) |
| B01J 37/30 | (2006.01) |
| C01B 39/12 | (2006.01) |
| B01J 20/30 | (2006.01) |
| B01J 37/00 | (2006.01) |
| B01J 37/02 | (2006.01) |
| B01J 37/03 | (2006.01) |
| B01J 37/04 | (2006.01) |
| B01J 37/06 | (2006.01) |

(52) U.S. Cl.
CPC ....... *B01J 20/3071* (2013.01); *B01J 20/3078* (2013.01); *B01J 20/3085* (2013.01); *B01J 29/7038* (2013.01); *B01J 29/86* (2013.01); *B01J 37/0018* (2013.01); *B01J 37/0236* (2013.01); *B01J 37/031* (2013.01); *B01J 37/04* (2013.01); *B01J 37/06* (2013.01); *B01J 37/082* (2013.01); *B01J 37/30* (2013.01); *B01J 2229/183* (2013.01); *C01B 39/12* (2013.01); *C01P 2002/72* (2013.01); *C01P 2002/86* (2013.01)

(58) Field of Classification Search
CPC ...... B01J 29/7038; B01J 37/082; B01J 20/10; B01J 20/305; B01J 20/3085; B01J 37/30; B01J 229/183
See application file for complete search history.

(56) References Cited

U.S. PATENT DOCUMENTS

| | | | |
|---|---|---|---|
| 5,107,047 | A | 4/1992 | Del Rossi |
| 5,173,281 | A | 12/1992 | Chang et al. |
| 5,284,643 | A | 2/1994 | Morrison et al. |
| 5,382,742 | A | 1/1995 | Morrison et al. |
| 2015/0298983 | A1 | 10/2015 | Maurer et al. |
| 2015/0368115 | A1 | 12/2015 | Parvulescu et al. |
| 2017/0225959 | A1 | 8/2017 | Maurer et al. |

FOREIGN PATENT DOCUMENTS

| | | | |
|---|---|---|---|
| WO | WO 2015/185633 A1 | 12/2015 | |
| WO | WO 2016/058541 A1 | 4/2016 | |
| WO | WO-2018046481 A1 * | 3/2018 | ............ C01B 39/48 |

OTHER PUBLICATIONS

Deforth et al, "Dry Synthesis of B-MFI, MTN- and MTW- type materials" Microporous Materials 9 (1997) 287-290 (Year: 1997).*
International Search Report dated Nov. 30, 2017 in PCT/EP2017/072200 filed Sep. 5, 2017, 5 pages.
International Preliminary Report on Patentability and Written Opinion of the International Searching Authority dated Mar. 21, 2019 in PCT/EP2017/072200 filed Sep. 5, 2017, 10 pages.
Michael E. Leonowicz, et al., "MCM-22: A Molecular Sieve with Two Independent Multidimensional Channel Systems" Science, vol. 264, 1994, pp. 1910-1913 and cover page.
Limin Ren, et al., "Solvent-Free Synthesis of Zeolites from Solid Raw Materials" Journal of the American Chemical Society, vol. 134, 2012, pp. 15173-15176.
Yinying Jin, et al. "Solvent-Free Synthesis of Silicoaluminophosphate Zeolites" Angewandte Chemie International Edition, vol. 52, 2013, pp. 9172-9175.
Russell E. Morris, et al. "Solventless Synthesis of Zeolites" Angewandte Chemie International Edition, vol. 52, 2013, pp. 2163-2165.
Qinming Wu, et al. "Sustainable Synthesis of Zeolites without Addition of Both Organotemplates and Solvents" Journal of the American Chemical Society, vol. 136, 2014, pp. 4019-4025.
P. Frontera, et al., "Transformation of MCM-22(P) into ITQ-2: The Role of Framework Aluminium" Microporous and Mesoporous Materials, vol. 106, 2007, pp. 107-114.

* cited by examiner

SOLIDOTHERMAL SYNTHESIS OF A BORON-CONTAINING ZEOLITE WITH AN MWW FRAMEWORK STRUCTURE

This application is a 371 filing of PCT/EP2017/072200, filed Sep. 6, 2016.

TECHNICAL FIELD

The present invention relates to a process for the preparation of a zeolitic material having an MWW framework structure comprising $YO_2$ and $B_2O_3$, wherein Y stands for a tetravalent element, wherein said process involves the solidothermal crystallization of a mixture containing 35 wt. % or less of $H_2O$ based on 100 wt. % of $YO_2$ contained therein. Furthermore, the present invention relates to a zeolitic material having an MWW framework structure obtained and/or obtainable according to said process, as well as to its use in particular applications.

INTRODUCTION

Zeolites are microporous crystalline solids which are characterized by a well-defined pore or cavity or channel structure of molecular dimensions. Zeolites have been widely used in petrochemistry (e.g., fluid catalytic cracking and hydrocracking), ion exchange (e.g., water softening and purification), and in the separation and removal of gases and solvents. The industrial application value of a zeolite is generally associated with its structure uniqueness as well as the production cost of the zeolite. Notably, some zeolitic materials, for example, with an MFI, FAU, or MOR framework structure, have been found to be very versatile in industrial applications, since the chemical properties of such zeolites can be tuned for meeting different requirements.

Among the zeolitic frameworks discovered in recent years, the MWW structure has attracted considerable attention in both academic research and practical applications. The MWW framework structure is characterized by two independent pore systems. Specifically, one pore system comprises two-dimensional sinusoidal 10-member ring (10-MR) channels with an elliptical ring cross section of 4.1 Å×5.1 Å. The other pore system comprises large 12-MR super-cages connected by 10-MR windows. More structural details of the MWW framework structure were described by M. E. Leonowicz et al. in Science, vol. 264 (1994), pages 1910-1913. Besides said unique structural features, it is also noted that MWW zeolites are synthesized by first forming layered precursors intercalated with organic template molecules after a crystallization process. Upon a further calcination, the dehydroxylation and condensation between the two dimensional layered precursors lead to the formation of the zeolitic product with a three-dimensional MWW framework.

Owing to the unique combination of 10-MR and 12-MR channel systems, MWW zeolites, in particular aluminosilicate MCM-22, have been investigated as shape selective catalysts for hydrocarbon conversions, also as adsorbents for separation and purification processes in the petroleum, petrochemical and refining industries. For example, U.S. Pat. No. 5,107,047 discloses the application of zeolite MCM-22 for isomerization of olefins. Similarly, U.S. Pat. No. 4,992,615 discloses alkylation of iso- and ethyl benzene in liquid phase by alkylation of benzene with propylene.

The synthesis of zeolite MCM-22 has already been extensively investigated. For example, U.S. Pat. No. 4,954,325 A discloses the synthesis of zeolite MCM-22 using hexamethyleneimine as an organotemplate under hydrothermal conditions at a temperature in the range of 80-225° C. for 24 hours to 60 days. However, the disadvantage of using hexamethyleneimine as an organotemplate is that hexamethyleneimine is highly toxic and expensive, which render it unsuitable for a large scale synthesis of MWW zeolites including MCM-22.

U.S. Pat. No. 5,173,281 A relates to the synthesis synthetic porous crystalline materials employing organic structure directing agents, wherein in particular aminocyclohexane, aminocyclopentane, aminocycloheptane, 1,4-diazacycloheptane, and azacyclooctane are employed. U.S. Pat. No. 5,284,643 A concerns the preparation of Ga-containing MCM-22, wherein although hexamethyleneimine is specifically employed as a structure directing agent, aminocyclohexane, aminocyclopentane, aminocycloheptane, 1,4-diazacycloheptane, and azacyclooctane, amongst others, are also mentioned as possible organic structure directing agents.

WO 2015/185633 A, on the other hand, teaches a facile and inexpensive method for the production of a material with an MWW framework structure which employs specific cycloalkylamine organotemplates with the seed crystals.

Although several processes exist for synthesizing boron-containing zeolites with an MWW framework structure, there still remains a need for further improving the synthetic processes to obtain such zeolites. Recently, Ren et al. in *J. Am. Chem. Soc.* 2012, 134, 15173-15176 and Jin et al. in *Angew. Chem. Int. Ed.* 2013, 52, 9172-9175 reported the solvent-free synthesis of aluminosilicate and aluminophosphate-based zeolites, emphasizing the advantages linked thereto such as increasing zeolite yield, reducing water pollution, and eliminating high pressure conditions encountered in conventional synthetic methodologies. The importance of solvent-free synthetic methodologies has also been highlighted by Morris et al. in *Angew. Chem. Int. Ed.* 2013, 52, 2163-2165.

Wu et al. in *J. Am. Chem. Soc.* 2014, 136, 4019-4025 relates to the solvent-free synthesis of zeolites in the absence of organotemplates, and in particular of ZSM-5 and beta zeolite. WO 2014/086300 A concerns the organotemplate-free solid-state synthetic method for zeolite molecular sieves and in particular to ZSM-5, beta zeolite, and to zeolitic materials having the FAU, MOR, GIS, and LTA framework structures. WO 2016/058541 A relates to the solidothermal synthesis of zeolitic materials, and in particular to those having the MFI, BEA, EUO, TON, MTN, ITH, BEC, and ITW framework structures.

Compared with the conventional synthesis, the solidothermal synthesis not only has all advantages associated with solvent-free synthesis, but also uses minimal organic templates. Said synthetic methodologies are however limited to the direct synthesis of particular types of zeolitic materials displaying specific framework structure types.

DETAILED DESCRIPTION

It was therefore the object of the present invention to provide an improved process for the preparation of zeolitic materials having an MWW framework structure comprising $YO_2$ and $B_2O_3$, wherein Y stands for a tetravalent element, and in particular for Si. Thus is has quite unexpectedly been found that the layered precursors of the MWW framework structure may be prepared according to a solidothermal process which does not employ a solvent. This was particularly surprising given the fact that said layered precursors do not display the three-dimensional covalently bound structure of zeolitic materials, but may only be transformed therein by employing an additional calcination step leading to the condensation of the hydroxyl groups on the surfaces of adjacent layers to the final MWW framework structure. Thus, it has quite unexpectedly been found that a solido-thermal methodology may be employed for the preparation of zeolitic precursor materials and in particular to the production of a layered zeolitic precursor of the MWW framework structure which does not display the long range 3-dimensional framework structure of a covalently bound zeolitic framework, but rather consists of arrays of loosely associated 2-dimensional layers which are highly hydrophilic due to the high content of hydroxyl moieties located on the surfaces facing the respective layers. In particular, it was completely unexpected to find that the synthesis of such hydrophilic structures containing high amounts of hydroxyl groups may be formed under solvent-free conditions.

Therefore, the present invention relates to a process for the production of a zeolitic material having an MWW framework structure comprising $YO_2$ and $B_2O_3$, wherein Y stands for a tetravalent element, said process comprising
(i) preparing a mixture comprising one or more sources for $YO_2$, one or more sources for $B_2O_3$, one or more organotemplates, and seed crystals,
(ii) crystallizing the mixture obtained in (i) for obtaining a layered precursor of the MWW framework structure,
(iii) calcining the layered precursor obtained in (ii) for obtaining the zeolitic material having an MWW framework structure,
wherein the one or more organotemplates have the formula (I)

$$R^1R^2R^3N \qquad (I)$$

wherein $R^1$ is $(C_5-C_8)$cycloalkyl, and
wherein $R^2$ and $R^3$ are independently from each other H or alkyl, and
wherein the mixture prepared in (i) and crystallized in (ii) contains 35 wt. % or less of $H_2O$ based on 100 wt. % of $YO_2$ contained in the mixture prepared in (i) and crystallized in (ii).

According to the present invention, the mixture prepared in (i) and crystallized in step (ii) contains 35 wt. % or less of $H_2O$ based on 100 wt. % $YO_2$. Thus, there is no particular restriction relative to the amount of $H_2O$ contained in the mixture prepared in (i) and crystallized in step (ii) provided that it does not exceed the amount of 35 wt. % or less of $H_2O$ based on 100 wt. % of $YO_2$. Thus, by way of example, the mixture prepared in (i) and crystallized in step (ii) may contain 30 wt. % or less of $H_2O$ based on 100 wt. % of $YO_2$ contained in the mixture prepared in (i) and crystallized in step (ii), wherein preferably the mixture contains 25 wt. % or less of $H_2O$, more preferably 20 wt. % or less, more preferably 25 wt. % or less, more preferably 10 wt. % or less, more preferably 5 wt. % or less, more preferably 3 wt. % or less, more preferably 1 wt. % or less, more preferably 0.5 wt. % or less, more preferably 0.1 wt. % or less, and more preferably 0.05 wt. % or less. According to the inventive process it is however particularly preferred that the mixture prepared in (i) and crystallized in step (ii) contains 0.01 wt. % or less of $H_2O$ based on 100 wt. % of $YO_2$ contained in the mixture prepared in (i) and crystallized in step (ii).

Although there is principally no limitation as to the components which may be provided to the mixture in step (i) in addition to the one or more sources of $YO_2$, one or more sources for $B_2O_3$, one or more organotemplates, and seed crystals, it is preferred that the mixture prepared in (i) and crystallized in step (ii) does not contain more than a particular amount of specific elements. Thus, by way of example, it is preferred that the mixture prepared in (i) and crystallized in step (ii) contains not more than a specific amount of fluoride. More specifically, it is preferred according to the inventive process that the mixture prepared in (i) contains 5 wt. % or less of fluoride calculated as the element and based on 100 wt. % of $YO_2$ contained in the mixture prepared in (i) and crystallized in step (ii), wherein more preferably the mixture prepared in (i) contains 3 wt. % or less, more preferably 2 wt. % or less, more preferably 1 wt. % or less, more preferably 0.5 wt. % or less, more preferably 0.1 wt. % or less, more preferably 0.05 wt. % or less, more preferably 0.01 wt. % or less, and more preferably 0.005 wt. % or less of fluoride calculated as the element and based on 100 wt. % of $YO_2$ contained in the mixture prepared in (i) and crystallized in step (ii). According to the inventive process it is however particularly preferred that the mixture prepared in (i) and crystallized in step (ii) contains 0.001 wt. % or less of fluoride based on 100 wt. % of $YO_2$ contained in the mixture prepared in (i) and crystallized in step (ii). Within the meaning of the present invention, "fluoride calculated as the element" refers to the single element, i.e. to the monoatomic species F as opposed to $F_2$.

According to the present invention it is yet further preferred that the mixture prepared in (i) and crystallized in step (ii) does not contain more than a specific amount of phosphorous and/or Al. In particular, it is further preferred that the mixture prepared in (i) and crystallized in step (ii) contains 5 wt. % or less of P and/or Al calculated as the respective element and based on 100 wt. % of $YO_2$ contained in the mixture prepared in (i) and crystallized in step (ii), wherein more preferably said mixture contains 3 wt. % or less of P and/or Al, and more preferably 2 wt. % or less, more preferably 1 wt. % or less, more preferably 0.5 wt. % or less, more preferably 0.1 wt. % or less, more preferably 0.05 wt. % or less, more preferably 0.01 wt. % or less, and more preferably 0.005 wt. % or less. According to the inventive process it is particularly preferred that the mixture prepared in (i) and crystallized in step (ii) contains 0.001 wt. % or less of P and/or Al calculated as the respective element and based on 100 wt. % of $YO_2$ contained in the mixture prepared in (i) and crystallized in step (ii).

Within the meaning of the present invention, the term "layered precursor" with respect to the zeolitic material having an MWW framework structure refers to a material obtainable and/or obtained in the course of the synthesis of a zeolitic material having an MWW framework structure with the use of an organotemplate, wherein said precursor material is initially crystallized and forms layered precursors intercalated with the organic template molecules. It is noted that in literature, layered precursors of zeolitic materials and in particular of zeolitic materials having an MWW framework structure are designated by the term "(P)" placed after the name of the zeoliteic material having an MWW framework structure to which it is a layered precursor. Thus, by way of example, the layered precursor to the MCM-22 zeolitic material having an MWW framework structure is designated as MCM-22(P) (cf. e.g. Frontera et al. in *Microporous and Mesoporous Materials* 2007, Vol. 106, pp. 107-114). From said layered precursor, the zeolitic material having an MWW framework structure may be obtained by dehydroxylation and condensation between the two-dimensional layered precursors leading to the formation of the three-dimensional MWW-framework. Typically, the dehydroxylation and condensation is achieved by thermal treatment of the layered precursor, in particular by calcination thereof, wherein said calcination may be conducted at a temperature in the range of anywhere from 300 to 900° C., more preferably from 400 to 700° C., more preferably from 450 to 650° C., and more preferably from 500 to 600° C. As regards the layered precursor obtained in (ii) according to the inventive process, no particular restrictions apply such that in principle any conceivable layered precursor may be obtained provided that it may form a zeolitic material having an MWW framework structure upon calcination thereof in (iii). It is, however, preferred according to the present invention that the layered precursor obtained in (ii) is selected from the group consisting of B-MCM-22(P), B-ERB-1(P), BITQ-1(P), B-PSH-3(P), B-SSZ-25(P), and mixtures of two or more thereof, and more preferably from the group consisting of B-MCM-22(P), B-ITQ-1(P), B-SSZ-25(P), and mixtures of two or more thereof. According to the present invention it is however particularly preferred that the layered precursor comprises B-MCM-22(P) and/or B-SSZ-25(P), and preferably comprises BMCM-22(P), wherein more preferably the layered precursor obtained in (ii) is B-MCM-22(P).

Concerning the zeolitic material having an MWW framework structure obtained in (iii), on the other hand, again no particular restrictions apply in its respect such that in principle any zeolitic material having an MWW framework structure may be obtained in (iii) according to the inventive process, provided that it may be obtained from a layered precursor obtained from crystallization in (ii) upon calcination of said layered precursor in (iii). It is, however, preferred according to the present invention that the zeolitic material having an MWW framework structure obtained in (iii) is selected from the group consisting of B-MCM-22, B-ERB-1, B-ITQ-1, B-PSH-3, B-SSZ-25, and mixtures of two or more thereof, and more preferably from the group consisting of B-MCM-22, B-ITQ-1, B-SSZ-25, and mixtures of two or more thereof. According to the present invention it is however particularly preferred that the zeolitic material having an MWW framework structure comprises B-MCM-22 and/or B-SSZ-25, and preferably comprises B-MCM-22, wherein more preferably the zeolitic material having an MWW framework structure obtained in (iii) is B-MCM-22.

According to the present invention, the MWW framework structure of the boron-containing zeolitic material comprises Y and oxygen, preferably in a form that the Y atoms are interconnected via oxygen. More preferably, the Y atoms are tetrahedrally coordinated and interconnected via oxygen in the MWW framework structure.

Concerning the Y element in the zeolitic material, no restriction applies according to the present invention as to the type or types of Y element which may be employed, provided that at least a portion thereof may be incorporated into the MWW framework structure as $YO_2$. Thus, any conceivable tetravalent element Y may be employed, wherein said element is preferably selected from the group consisting of Si, Sn, Ti, Zr, Ge and combinations of two or more thereof. Y is however more preferably Si and/or Ti, and is more preferably Si.

According to the present invention, boron is contained in the zeolitic material having an MWW framework, wherein boron is contained in the MWW framework structure of the zeolitic material.

Preferably the boron atoms contained in the MWW framework structure are interconnected via oxygen, wherein more preferably, the boron atoms are tetrahedrally coordinated and interconnected via oxygen in the MWW framework structure.

Step (i)

According to (i) of the present inventive process, one or more sources for $YO_2$ are comprised in the mixture prepared in said step, Y being preferably selected from the group consisting of Si, Sn, Ti, Zr, Ge and combinations of two or more thereof, wherein Y is more preferably Si and/or Ti, and more preferably Si.

For the preferred embodiments wherein Y is Si in step (i), the one or more sources for $YO_2$ in the mixture are one or more sources for $SiO_2$.

Concerning the one or more sources for $YO_2$ in the mixture of step (i), again no particular restriction applies in their respect provided that at least a portion of the $YO_2$ contained therein or which may be provided by said source by appropriate chemical transformation thereof may be incorporated into the MWW framework structure as $SiO_2$. According to the present invention, said one or more sources of $YO_2$ are preferably selected from the group consisting of silicas, silicates, silicic acid and combinations of two or more thereof, more preferably selected from the group consisting of silicas, alkali metal silicates, silicic acid, and combinations of two or more thereof, more preferably selected from the group consisting of fumed silica, colloidal silica, reactive amorphous solid silica, silica gel, pyrogenic silica, lithium silicates, sodium silicates, potassium silicates, silicic acid, and combinations of two or more thereof, more preferably selected from the group consisting of fumed silica, silica gel, pyrogenic silica, sodium silicates, silicic acid, and combinations of two or more thereof, more preferably selected from the group consisting of fumed silica, silica gel, pyrogenic silica, and combinations of two or more thereof, wherein more preferably the one or more sources for $YO_2$ is silica gel.

More preferably, silica gel of the formula $SiO_2 \cdot x\, H_2O$ is employed as the source for $YO_2$ in the mixture of step (i). As regards the value of x in the formula of the silica gel which is particularly preferably used in the inventive process, no particular restrictions apply provided that the mixture prepared in (i) and crystallized in (ii) contains 35 wt. % or less of $H_2O$ based on 100 wt. % of $YO_2$ contained in the mixture prepared in (i) and crystallized in (ii). Thus, by way of example, x in the formula $SiO_2 \cdot x\, H_2O$ may be in the range of anywhere from 0.1 to 1.165, wherein preferably x is in the range of from 0.3 to 1.155, more preferably from 0.5 to 1.15, and more preferably from 0.8 to 1.13. According to the present invention it is however particularly preferred that x in the formula $SiO_2 \cdot x\, H_2O$ is in the range of from 1 to 1.1.

According to step (i) of the present inventive process, one or more organotemplates are comprised in the mixture of said step, wherein the one or more organotemplates have the formula (I)

$$R^1R^2R^3N \qquad (I)$$

wherein $R^1$ is $(C_5\text{-}C_8)$cycloalkyl, and
wherein $R^2$ and $R^3$ are independently from each other H or alkyl.

Concerning group $R^1$ in formula (I) of the one or more organotemplates, said group is preferably selected from the group consisting of substituted and/or unsubstituted cyclopentyl, cyclohexyl, cycloheptyl, and cyclooctyl, more preferably from the group consisting of substituted and/or unsubstituted cyclopentyl, cyclohexyl and cycloheptyl, wherein more preferably $R^1$ is substituted or unsubstituted cyclohexyl or cycloheptyl, more preferably substituted or unsubstituted cyclohexyl. More preferably, group $R^1$ in formula (I) of the one or more organotemplates is unsubstituted cyclohexyl.

Concerning groups $R^2$ and $R^3$ in formula (I) of the one or more organotemplates, said two groups are preferably, independently from each other, H or $(C_1-C_3)$ alkyl. More preferably, $R^2$ and $R^3$ are independently from each other selected from the group consisting of H, methyl, ethyl and propyl. More preferably, $R^2$ and $R^3$ in formula (I) of the one or more organotemplates are H.

According to the present inventive process, it is preferred that the one or more organotemplates in the mixture of step (i) are selected from the group consisting of substituted and/or unsubstituted $(C_5-C_8)$cycloalkylamines, preferably selected from the group consisting of substituted and/or unsubstituted cyclopentylamine, cyclohexylamine, cycloheptylamine, cyclooctylamine, and combinations of two or more thereof, more preferably substituted and/or unsubstituted cyclohexylamine and/or cycloheptylamine. More preferably, unsubstituted cyclohexylamine is the organotemplate in the mixture of step (i).

According to step (i) of the present inventive process, seed crystals are comprised in the mixture of the said step. Concerning the type or types of seed crystals which may be employed in the inventive process, no particular restrictions apply such that any suitable material may be employed to this effect, provided that it may induce nucleation of the layered precursor of the boron-containing zeolitic material obtained in step (ii), from which the zeolitic material having an MWW framework structure may then be obtained in step (iii) after calcination thereof. It is, however, preferred according to the present invention that the seed crystals comprise one or more zeolitic materials, wherein independently from one another said one or more zeolitic materials preferably comprise $YO_2$ and $X_2O_3$ in their framework structure, wherein X is a trivalent element, and Y is a tetravalent element.

As regards the trivalent element X which may be contained as $X_2O_3$ in the one or more zeolitic materials preferably comprised in the seed crystals, no particular restrictions apply such that in principle any suitable trivalent element X may be employed, provided that it is contained as $X_2O_3$ in the zeolitic material's framework structure. It is, however, preferred according to the present invention, that the X element in the seed crystals is selected from the group consisting of Al, B, In, Ga, and combinations of two or more thereof, wherein more preferably the trivalent element comprises Al and/or B. More preferably, the trivalent element X in the seed crystals is Al.

On the other hand and independently thereof, as regards the tetravalent element Y which may be contained as $YO_2$ in the one or more zeolitic materials preferably comprised in the seed crystals, no particular restrictions apply such that in principle any suitable tetravalent element Y may be employed, provided that it is contained as $YO_2$ in the zeolitic material's framework structure. It is, however, preferred according to the present invention, that the Y element in the seed crystals is selected from the group consisting of Si, Sn, Ti, Zr, Ge and combinations of two or more thereof, wherein more preferably the tetravalent element Y comprises Si and/or Ti. More preferably, the tetravalent element Y in the seed crystals is Si.

According to step (i) of the present inventive process, one or more sources for $B_2O_3$ are comprised in mixture of said step. As to the one or more sources for $B_2O_3$ which may be employed according to the inventive process, again no particular restriction applies in their respect provided that at least a portion of the $B_2O_3$ contained therein or which may be provided by said source by appropriate chemical transformation thereof may be incorporated into the MWW framework structure as $B_2O_3$. According to the present invention, said one or more sources for $B_2O_3$ are preferably selected from the group consisting of boric acid, boron oxide, borates, borate esters, and combinations of two or more thereof, preferably selected from the group consisting of boric acid, boron oxide, orthoborates, diborates, triborates, tetraborates, trimethyl borate, triethyl borate, and combinations of two or more thereof, wherein more preferably the one or more sources for $B_2O_3$ are boron oxide and/or boric acid. More preferably, boric acid is employed as the source for $B_2O_3$ in the mixture of step (i).

As regards the amounts in which $YO_2$ and $B_2O_3$ may be employed in the inventive process, these may be used in any suitable amounts provided that a boron-containing zeolitic material may be obtained according to the inventive process in which both $YO_2$ and $B_2O_3$ are contained in the MWW framework structure of the resulting material. Thus, according to preferred embodiments of the present inventive process, the molar ratio $YO_2:B_2O_3$ of the one or more sources of $YO_2$ to the one or more sources for $B_2O_3$ in the mixture prepared in (i) is in the range of from 1:1 to 100:1, preferably from 1.2:1 to 50:1, more preferably from 1.5:1 to 20:1, more preferably from 1.8:1 to 10:1, more preferably from 2:1 to 5:1, and more preferably from 2.2:1 to 4:1. More preferably, the molar ratio $YO_2:B_2O_3$ of the one or more sources of $YO_2$ to the one or more sources for $B_2O_3$ in the mixture prepared in (i) is in the range of from 2.5:1 to 3.5:1.

Concerning the seed crystals, in instances wherein the seed crystals contain one or more zeolitic materials, there is no restriction as to whether said seed crystals contain an organotemplate or not, depending on whether an organotemplate was employed in the preparation of the one or more zeolitic materials. Therefore, the seed crystals can principally be used in an uncalcined form which contains an organotemplate, or in a calcined form which does not contain organotemplates due to the calcination conditions under which the organotemplates are burned out of the seed crystals.

According to the present inventive process, apart from the one or more organotemplates provided in (i), there is principally no restriction as to further organotemplates which may be contained in the mixture provided therein. Thus, any further suitable further organotemplate or organotemplates may be prepared in (i), provided that a layer precursor of the boron-containing zeolitic material may be obtained in (ii) and a zeolitic material having an MWW framework structure may be obtained in (iii) after calcination thereof. Besides the addition of one or more further organotemplates as such, said one or more further organotemplates may independently thereof also be provided via the seed crystals. It is, however, preferred according to the present invention that apart from organotemplate optionally contained in the seed crystals, the mixture provided according to step (i) does not contain piperidine or hexamethyleneimine, preferably does not contain both piperidine and hexamethyleneimine, and more preferably does not contain $(C_4-C_7)$alkyleneimines and $(C_5-C_8)$alkylamines other than the one or more organotemplates according to formula (I), and more preferably does not contain alkyleneimines and alkylamines other than the one or more organotemplates according to formula (I). According to the present invention it is particularly preferred that the mixture provided in (i) does not contain any further organotemplates than the one or more organotemplates according to formula (I), including organotemplates optionally present in the seed crystals. Within the meaning of the present invention, unless specified otherwise, the wording "does not contain" with respect to components contained in the mixture prepared in (i) and crystallized in (ii) indicates an amount of 5 wt. % or less of said components based on 100 wt. % of $YO_2$ contained in the mixture prepared in (i) and crystallized in step (ii), and preferably an amount of 3 wt. % or less, more preferably of 2 wt. % or less, more preferably of 1 wt. % or less, more preferably of 0.5 wt. % or less, more preferably of 0.1 wt. % or less, more preferably of 0.05 wt. % or less, more preferably of 0.01 wt. % or less, more preferably of 0.005 wt. % or less, and more preferably of 0.001 wt. % or less of said components based on 100 wt. % of $YO_2$ contained in the mixture prepared in (i) and crystallized in step (ii).

Concerning the amount of the one or more organotemplates which may be employed in the inventive process, no particular restriction applies such that any suitable amount may be used provided that a boron-containing zeolitic material having an MWW framework structure comprising $YO_2$ and $B_2O_3$ may be obtained. According to the present inventive process, it is however preferred that the molar ratio organotemplate:$YO_2$ of the one or more organotemplates to the one or more sources for $YO_2$ in the mixture prepared in (i) is in the range of from 0.05:1 to 3:1, preferably from 0.1:1 to 1.5:1, more preferably from 0.2:1 to 0.8:1, more preferably from 0.25:1 to 0.5:1, more preferably from 0.3:1 to 0.4:1, more preferably from 0.32:1 to 0.35:1, more preferably from 0.33:1 to 0.34:1, wherein the one or more organotemplates do not include organotemplate optionally contained in the seed crystals, wherein said one or more sources for $YO_2$ may include or not include the amount of $YO_2$ provided in the seed crystals in step (i), and preferably do not include the amount of $YO_2$ provided to the mixture by the seed crystals in step (i).

According the present inventive process, it is further preferred that the molar ratio $YO_2$:$B_2O_3$ organotemplate of the one or more sources of $YO_2$ to the one or more sources of $B_2O_3$ to the one or more organotemplates in the mixture provided according to step (i) is in the range of 1:(0.01-1):(0.05-3), preferably in the range of 1:(0.02-0.8):(0.1-1.5), more preferably in the range of 1:(0.05-0.7):(0.2-0.8), more preferably in the range of 1:(0.1-0.6):(0.25-0.5), more preferably in the range of 1:(0.2-0.5):(0.3-0.4), more preferably in the range of 1:(0.25-0.45):(0.32-0.35), more preferably in the range of 1:(0.3-0.4):(0.33-0.34), wherein the one or more organotemplates do not include the organotemplate optionally contained in the seed crystals, wherein said one or more sources for $YO_2$ may include or not include the amount of $YO_2$ provided by the seed crystals, wherein said one or more sources for $B_2O_3$ may include or not include the amount of $B_2O_3$ in the seed crystals when the seed crystals contain $B_2O_3$ in step (i). According to the present invention, it is preferred that the one or more sources for $YO_2$ do not include the amount of $YO_2$ provided to the mixture by the seed crystals in step (i), nor does the one or more sources of $B_2O_3$ include the amount of $B_2O_3$ which may be contained in the seed crystals in step (i).

In principle, there is no restriction as to further components which may be prepared in (i) of the inventive process, provided that a layered precursor of the boron-containing zeolitic material may be obtained in (ii) and subsequently a boron-containing zeolitic material having an MWW framework structure may be obtained in (iii). Thus, by way of example, it is further preferred according to the present inventive process, that the mixture prepared in (i) comprises one or more sources for $M_2O$, wherein M stands for one or more alkali metals M. In this respect, the one or more alkali metals M are preferably selected from the group consisting of Li, Na, K, Rb, Cs, and combinations of two or more thereof, more preferably from the group consisting of Li, Na, Rb and combinations of two or more thereof, wherein more preferably the one or more alkali metals M are Li and/or Na. More preferably, the mixture prepared in (i) of the present inventive process comprises one or more sources of $Na_2O$. Within the meaning of the present invention, the term "$M_2O$" does not refer to the oxide as such but, as for the terms "$YO_2$" and "$X_2O_3$" such as $B_2O_3$ to the presence of said compounds as constituting elements of the framework structure of the zeolitic material, wherein "$M_2O$" refers to M as extra-framework element which is ionically bound to the negatively charged framework and which may accordingly be ion exchanged against one or more further cationic elements and/or moieties.

In instances wherein one or more sources for $M_2O$ are provided in the mixture in step (i), no particular restriction applies neither with respect to the type or types of M, nor with respect to the amounts in which the one or more sources for $M_2O$ may be provided. Thus, by way of example, the molar ratio $M_2O$:$YO_2$ of the mixture prepared in (i) may range anywhere from 0.0005:1 to 2:1, preferably from 0.001:1 to 1:1, more preferably from 0.005:1 to 0.5:1, more preferably from 0.01:1 to 0.3:1, more preferably from 0.03:1 to 0.1:1, more preferably from 0.05:1 to 0.08:1. More preferably, the molar ratio $M_2O$:$YO_2$ of the mixture prepared in (i) is in the range of from 0.06:1 to 0.07:1.

Furthermore, it is preferred according to the inventive process that the molar ratio $YO_2$:$B_2O_3$:$M_2O$ of the mixture prepared in (i) is in the range of 1:(0.01-1):(0.0005-2), preferably in the range of 1:(0.02-0.8):(0.001-1), more preferably in the range of 1:(0.05-0.7):(0.005-0.5), more preferably in the range of 1:(0.1-0.6):(0.01-0.3), more preferably in the range of 1:(0.2-0.5):(0.03-0.1), and more preferably in the range of 1:(0.25-0.45):(0.05-0.08). More preferably, the molar ratio $YO_2$:$B_2O_3$:$M_2O$ of the mixture prepared in (i) is in the range of 1:(0.3-0.4):(0.06-0.07).

According to preferred embodiments of the present inventive process, no restriction applies as to the amount of seed crystals in the mixture prepared in (i). Thus, by way of example, the amount of seed crystals provided in (i) may range anywhere from 0.05 to 25 weight-% based on 100 weight-% of $YO_2$ in the one or more sources for $YO_2$, wherein preferably the amount of seed crystals ranges from 0.1 to 20 weight-%, more preferably from 0.2 to 15 weight-%, more preferably from 0.5 to 12 weight-%, more preferably from 1 to 10 weight-%, more preferably from 3 to 7 weight-%. More preferably, the amount of seed crystals in the mixture prepared in (i) is in the range of from 4 to 6 weight-%.

Step (ii)

According to the present inventive process, the mixture obtained in step (i) is crystallized in step (ii), for obtaining a layered precursor of a boron-containing MWW-type zeolitic material.

Concerning the crystallization procedure of step (ii), said procedure is preferred to involve heating of the mixture of step (i), wherein any suitable temperature may be employed provided that a layered precursor of the boron-containing zeolitic material may be obtained in (ii). Thus, by way of example, the crystallization in (ii) may be conducted at a temperature in the range of from 80 to 250° C., preferably from 100 to 230° C., more preferably from 130 to 210° C., more preferably from 150 to 200° C., and more preferably from 170 to 190° C. More preferably, the crystallization process of step (ii) involves heating of the mixture of step (i) at a temperature in the range from 175 to 185° C.

Regarding the pressure under which crystallization in step (ii) may be performed, again no particular restriction applies provided that a zeolitic material having an MWW framework structure comprising $YO_2$ and $B_2O_3$ may be obtained in step (ii). Thus, by way of example, crystallization in step (ii) may be performed under ambient pressure such as in an open system or may be performed at pressures elevated relative to ambient pressure, in particular in instances wherein crystallization in step (ii) involves heating of the mixture. Accordingly, crystallization in step (ii) may be preformed in an open system for obtaining a zeolitic material having an MWW framework structure comprising $YO_2$ and $B_2O_3$, or may be crystallized at an elevated pressure relative to ambient pressure either by artificially increasing the pressure under which crystallization takes place and/or by creating pressure in the mixture crystallized in step (ii) by means of chemical reaction and/or physical heating of the mixture. According to the inventive process it is accordingly preferred that in step (ii) the mixture is crystallized under autogenous pressure. To this effect, crystallization in step (ii) is preferably performed in a pressure-tight vessel, more preferably in an autoclave.

Concerning the duration of the crystallization procedure in step (ii), no specific restrictions exist. It is however preferred that said procedure is carried out for a period in the range of from 1 d to 25 d, preferably from 3 d to 20 d, more preferably from 5 d to 18 d, more preferably from 7 d to 15 d, more preferably from 9 to 12 d. More preferably, the crystallization procedure in step (ii) is carried out for a period in the range of from 9.5 to 10.5 d.

According to the present invention, it is preferred that after (ii) and prior to (iii) the process further comprises
(a) isolating the layered precursor obtained in (ii), preferably by filtration,
(b) optionally washing the layered precursor obtained in (a),
(c) optionally drying the layered precursor obtained in (a) or (b),
(d) optionally subjecting the layered precursor obtained in (a), (b), or (c) to ion exchange,
(e) optionally subjecting the layered precursor obtained in (a), (b), (c), or (d) to isomorphous substitution.

In step (a) of the inventive process, the layered precursor obtained in step (ii) may be isolated by any conceivable means, such as filtration, ultrafiltration, diafiltration, centrifugation, spray-drying and/or decantation methods, wherein the filtration methods may involve suction and/or pressure filtration steps. Preferably, the isolation of the layered precursor obtained step (ii) is achieved by filtration and/or spray drying, more preferably by filtration.

In optional step (b) of the inventive process, the washing of the layered precursor may be achieved by any conceivable means using any suitable washing agents. Washing agents which may be used are, for example, water, alcohols, and mixtures of two or more thereof. More specifically, the washing agents may be selected from the group consisting of water, methanol, ethanol, propanol, or mixtures of two or more thereof. Examples of mixtures are mixtures of two or more alcohols, such as methanol and ethanol, or methanol and propanol, or ethanol and propanol, or methanol and ethanol and propanol, or mixtures of water and at least one alcohol, such as water and methanol, or water and ethanol, or water and propanol, or water and methanol and ethanol, or water and methanol and propanol, or water and methanol and ethanol and propanol. More preferably, the washing agents are water and/or at least one alcohol, more preferably water and/or ethanol. Even more preferably, the washing agent is water in optional step (b).

In optional step (c) of the inventive process, the drying of the layered precursor may be achieved by any conceivable temperature, provided that the solvent residues and/or moisture comprised in the layered precursor is removed. Accordingly, said drying procedure may principally be achieved by any one of for example desiccation, freeze-drying, heating, and/or applying vacuum to the layered precursor obtained in step (a) or (b).

According to preferred embodiments, drying in step (c) is achieved by heating of the layered precursor to a temperature in the range of from 50 to 250° C., preferably from 80 to 200° C., more preferably from 100 to 150° C., more preferably from 110 to 130° C. In general, the drying procedure of optional step (c) is performed for a duration which allows for the substantial removal of any solvent and/or moisture from the layered precursor. Preferably, drying is performed for a duration in the range of from 1 to 48 h, more preferably from 2 to 24 h, more preferably from 5 to 16 h.

According to the present invention, the layered precursor obtained in (a), (b), or (c) is preferably subject in (d) to one or more ion exchange procedures with $H^+$ and/or $NH_4^+$, preferably with $NH_4$. According to particularly preferred embodiments of the present invention wherein the mixture prepared in (i) comprises one or more sources for $M_2O$, it is preferred that the one or more alkali metals M according to any of the particular and preferred embodiments of the present invention and in particular Na is contained as exchangeable ions in the layered precursor obtained in (a), (b), or (c) and is accordingly exchanged in (d) against $H^+$ and/or $NH_4^+$, and preferably against $NH_4^+$.

As regards the preferred ion exchange procedure in (d), it is further preferred that said procedure is repeated at least once, wherein more preferably the ion-exchange procedure in (d) is repeated from one to five times, preferably from one to four times, and more preferably two or three times. According to the present invention it is particularly preferred that the ion exchange procedure in (d) of the layered precursor obtained in (a), (b), or (c) is repeated twice.

Concerning the temperature at which the preferred ion exchange procedure in (d) is conducted, again, no particular restrictions apply provided that at least a portion of the exchangeable ions contained in the layered precursor obtained in (a), (b), or (c) may be exchanged against $H^+$ and/or $NH_4$, and preferably against $NH_4$. Thus, by way of example, the ion-exchange procedure in (d) may conducted at a temperature in the range of anywhere from 30 to 160° C., wherein preferably the ion exchange procedure in (d) is conducted at a temperature in the range of from 40 to 140° C., more preferably from 50 to 120° C., more preferably from 60 to 100° C., more preferably from 70 to 90° C., and more preferably of from 75 to 85° C.

According to the present invention it is preferred that the ion exchange procedure in (d) is conducted in a solvent system comprising one or more solvents. As concerns the solvent system which may be employed to this effect, no particular restrictions apply such that in principle any solvent system may be employed in (d), provided that at least a portion of the exchangeable ions contained in the layered precursor obtained in (a), (b), or (c) may be exchanged against $H^+$ and/or $NH_4$, and preferably against $NH_4$. Thus, by way of example, the solvent system may comprise water and/or one or more organic solvents, wherein preferably one or more solvents comprised in the solvent system are selected from the group consisting of water, monohydric alcohols, polyhydric alcohols, and combinations of two or more thereof, more preferably from the group consisting of water, methanol, ethanol, propanol, butanol, pentanol, ethane-1,2-diol, propane-1,2-diol, propane-1,2,3-triol, butane-1,2,3,4-tetraol, pentane-1,2,3,4,5-pentol, and combinations of two or more thereof, and more preferably from the group consisting of water, methanol, ethanol, 2-propanol, and mixtures of two or more thereof. According to the present invention, it is particularly preferred that the solvent system preferably employed in (d) comprises water, wherein more preferably the ion-exchange procedure is conducted in water as the solvent system, more preferably in deionized water.

As regards the duration of the ion exchange, no particular restrictions apply according to the present invention such that ion exchange may in principle be conducted for any suitable duration provided that at least a portion of the exchangeable ions contained in the layered precursor obtained in (a), (b), or (c) may be exchanged against $H^+$ and/or $NH_4$, and preferably against $NH_4^+$. Thus, by way of example, ion exchange in (d) may be conducted for a duration ranging anywhere from 15 min to 6 h, wherein preferably ion exchange in (d) is conducted for a duration ranging from 30 min to 3 h, and more preferably from 45 min to 1.5 h.

In optional step (e) of the inventive process, boron in the framework structure of the layered precursor obtained in (a), (b), (c), or (d) is isomorphously substituted against one or more trivalent and/or tetravalent elements. According to the present invention, no particular restrictions apply as to the one or more trivalent and/or tetravalent elements which may be employed to this effect, provided that at least a portion of the boron contained in the framework structure of the layered precursor obtained in (a), (b), (c), or (d) is isomorphously substituted against one or more of said elements. It is, however, preferred according to the inventive process that, independently from one another, the one or more trivalent elements are selected from the group consisting of Al, Ga, In, and combinations of two or more thereof, and the one or more tetravalent elements are selected from the group consisting of Ti, Ge, Sn, and combinations of two or more thereof. According to the present invention it is however particularly preferred that the layered precursor obtained in (a), (b), (c), or (d) is isomorphously substituted against Al and/or Ti, and preferably against Al.

As regards the form in which the one of more trivalent and/or tetravalent elements for isomorphous substitution in optional step (e) are employed according to particular and preferred embodiments of the present invention, no particular restrictions apply provided that at least a portion of the boron contained in the framework structure of the layered precursor obtained in (a), (b), (c), or (d) is isomorphously substituted against one or more of said elements. It is, however, preferred according to the inventive process that in (e) the one or more trivalent and/or tetravalent elements for isomorphous substitution are provided in the form of one or more salts, and preferably in the form of one or more salts selected from the group consisting of halides, sulfates, sulfites, hydroxides, nitrates, nitrites, phosphates, phosphites, acetates, and mixtures of two or more thereof, more preferably in the form of one or more salts selected from the group consisting of chlorides, bromides, sulfates, hydroxides, nitrates, phosphates, acetates, and mixtures of two or more thereof. According to the present invention it is particularly preferred that the one or more trivalent and/or tetravalent elements for isomorphous substitution in (e) are provided in the form of their nitrates.

According to the present invention it is preferred that the isomorphous substitution in (e) is conducted in a solvent system comprising one or more solvents. As concerns the solvent system which may be employed to this effect, no particular restrictions apply such that in principle any solvent system may be employed in (e), provided that at least a portion of the boron contained in the framework structure of the layered precursor obtained in (a), (b), (c), or (d) is isomorphously substituted against one or more of the trivalent and/or tetravalent elements. Thus, by way of example, the solvent system may comprise water and/or one or more organic solvents, wherein preferably one or more solvents comprised in the solvent system are selected from the group consisting of water, monohydric alcohols, polyhydric alcohols, and combinations of two or more thereof, more preferably from the group consisting of water, methanol, ethanol, propanol, butanol, pentanol, ethane-1,2-diol, propane-1,2-diol, propane-1,2,3-triol, butane-1,2,3,4-tetraol, pentane-1,2,3,4,5-pentol, and combinations of two or more thereof, and more preferably from the group consisting of water, methanol, ethanol, 2-propanol, and mixtures of two or more thereof. According to the present invention, it is particularly preferred that the solvent system preferably employed in (e) comprises water, wherein more preferably the ion-exchange procedure is conducted in water as the solvent system, more preferably in deionized water.

As regards the duration of the isomorphous substitution in (e), no particular restrictions apply according to the present invention such that isomorphous substitution may in principle be conducted for any suitable duration provided that at least a portion of the boron contained in the framework structure of the layered precursor obtained in (a), (b), (c), or (d) is isomorphously substituted against one or more of the trivalent and/or tetravalent elements. Thus, by way of example, isomorphous substitution in (e) may be conducted for a duration ranging anywhere from 0.5 to 10 d, wherein preferably isomorphous substitution in (e) is conducted for a duration ranging from 1 to 8 d, more preferably from 2 to 6 d, more preferably from 2.5 to 5.5 d, more preferably from 3 to 5 d, and more preferably from 3.5 to 4.5 d.

Concerning the temperature at which the isomorphous substitution in (e) is conducted, again, no particular restrictions apply provided that at least a portion of the boron contained in the framework structure of the layered precursor obtained in (a), (b), (c), or (d) is isomorphously substituted against one or more of the trivalent and/or tetravalent elements. Thus, by way of example, the isomorphous substitution in (e) may conducted at a temperature in the range of anywhere from 30 to 160° C., wherein preferably the isomorphous substitution in (e) is conducted at a temperature in the range of from 50 to 140° C., more preferably from 70 to 120° C., more preferably from 90 to 110° C., and more preferably from 95 to 105° C.

Step (iii)

According to the present inventive process, the layered precursor obtained in step (ii) is calcined for obtaining a boron-containing zeolitic material having an MWW framework structure.

Concerning the calcination procedure in step (iii), no particular restriction applies, provided that a boron-containing zeolitic material having an MWW framework structure is obtained in (iii). Thus, calcination may be performed under any suitable conditions, wherein said process is preferably carried out at a temperature in the range of from 300 to 900° C., preferably from 400 to 700° C., more preferably from 450 to 650° C. More preferably, the calcination procedure in step (iii) is carried out at a temperature from 500 to 600° C.

According to preferred embodiments of the present invention, the inventive process may further comprise after (iii) one or more steps of
(iv) deboronating the zeolitic material having an MWW framework structure obtained in (iii) with a liquid solvent system, thereby obtaining a deboronated zeolitic material having an MWW framework structure.

The deboronation procedure of the present invention relates to a procedure wherein at least a portion of the boron atoms contained in the zeolitic framework structure is removed. Within the meaning of the present invention, deboronation preferably does not lead to a complete removal of the boron contained in the framework structure but only to a reduction of its content such that in any case at least traces of boron will remain in the framework after completion of the deboronation procedure.

The liquid solvent system used in step (iv) is preferably selected from the group consisting of water, monohydric alcohols, polyhydric alcohols, and mixtures of two or more thereof. Concerning the monohydric alcohols and polyhydric alcohols, no specific restrictions exist. Preferably, these alcohols contain from 1 to 6 carbon atoms, more preferably from 1 to 5 carbon atoms, more preferably from 1 to 4 carbon atoms, and more preferably from 1 to 3 carbon atoms. The polyhydric alcohols preferably comprise from 2 to 5 hydroxyl groups, more preferably from 2 to 4 hydroxyl groups, preferably 2 or 3 hydroxyl groups. Especially preferred monohydric alcohols are methanol, ethanol, and propanol like 1-propanol and 2-propanol. Especially preferred polyhydric alcohols are ethane-1,2-diol, propane-1,2-diol, propane-1,3-diol, propane-1,2,3-triol. If mixtures of two or more of above-described compounds are employed, it is preferred that these mixtures comprise water and at least one monohydric and/or at least one polyhydric alcohol. Even more preferably, the liquid solvent system consists of water.

As regards the liquid solvent system used for the deboronation procedure of step (iv), in principle no particular restriction applies with respect to further components which may be contained in said liquid solvent system in addition to the particular and preferred solvents and combinations of solvent and in particular water which is particularly preferred as the solvent system. It is, however, preferred according to the present invention that the liquid solvent system does not contain an inorganic or organic acid or a salt thereof, the acid being selected from the group consisting of hydrochloric acid, sulfuric acid, nitric acid, phosphoric acid, formic acid, propionic acid, oxalic acid, and tartaric acid. According to the present invention it is further preferred that the solvent system used for the deboronation procedure does not contain an inorganic or organic acid or a salt thereof, wherein even more preferably the solvent system used for the deboronation procedure consists of water such that it does not contain any further components other than possible traces of impurities which may be present in distilled water.

As far as the amount of boron-containing zeolite relative to the amount of liquid solvent system for the deboronation procedure of step (iv), no specific restrictions exist. Preferably, the weight ratio of the boron-containing zeolitic material having an MWW framework structure relative to the liquid solvent system is in the range of from 1:5 to 1:40, more preferably from 1:10 to 1:30, more preferably from 1:10 to 1:20 such as from 1:10 to 1:15, from 1:11 to 1:16, from 1:12 to 1:17, from 1:13 to 1:18, from 1:14 to 1:19, from 1:15 to 1:20.

Concerning the deboronation procedure in step (iv), said process is preferably carried out at a temperature in the range of from 50 to 125° C., more preferably from 70 to 120° C., more preferably from 90 to 115° C., more preferably from 90 to 110° C., more preferably from 95 to 105° C. More preferably, the deboronation according to step (iv) is carried out at the boiling point of the solvent system. If the solvent system comprises 2 or more components, the deboronation according to step (iv) is preferably carried out at the boiling point of the component having the lowest boiling point. According to a further preferred embodiment of the present invention, the deboronation according to step (iv) is carried out under reflux. Thus, the preferred vessel used for the deboronation according to step (iv) is equipped with a reflux condenser. During the deboronation procedure of step (iv), the temperature of the liquid solvent system is kept essentially constant or changed. More preferably, the temperature is kept essentially constant.

Concerning the duration of the deboronation procedure in step (iv), no specific restrictions exist. Preferably, said deboronation procedure is carried out for a time period in the range of from 6 to 20 h, preferably from 7 to 17 h, more preferably from 8 to 14 h. More preferably, the deboronation procedure in step (iv) is carried out at a time period in the range of from 9 to 12 h. The time period is to be understood as the time where the liquid solvent system is maintained under the above-described deboronation temperature.

In principle, no particular restrictions apply relative to the seed crystals which may be employed in (i) provided that obtaining a layered precursor of the MWW framework structure may be obtained in (ii), from which a zeolitic material having an MWW framework structure may be obtained in (iii). According to the present invention, it is preferred that the seed crystals in the mixture prepared in (i) comprise a zeolitic material having an MWW framework structure and/or a layered precursor of a zeolitic material having an MWW framework structure. More preferably, the seed crystals comprise a zeolitic material having an MWW framework structure which is obtained or obtainable according to the present inventive process, and/or a layered precursor which is obtained or obtainable according to step (ii) of the present inventive process. Even more preferably, the seed crystals comprise a layered precursor which is obtained or obtainable according to step (ii) of the present inventive process.

As regards particular and preferred embodiments of the present invention wherein the seed crystals comprise a layered precursor of a zeolitic material having an MWW framework structure, it is further preferred according to the present invention that the layered precursor is selected from the group consisting of MCM-22(P), [Ga—Si—O]-MWW(P), [Ti—Si—O]-MWW(P), ERB-1(P), ITQ-1(P), PSH-3(P), SSZ-25(P), and mixtures of two or more thereof, wherein the layered precursor is more preferably selected from the group consisting of MCM-22(P), ITQ-1(P), SSZ-25(P), and mixtures of two or more thereof. According to the inventive process it is particularly preferred that the layered precursor of the preferred seed crystals comprises MCM-22(P) and/or SSZ-25(P), preferably MCM-22(P), wherein more preferably MCM-22(P) is employed as the seed crystals in the mixture prepared in (i) and crystallized in (ii).

On the other hand, concerning particular and preferred embodiments of the present invention wherein the seed crystals comprise a zeolitic material having an MWW framework structure, it is further preferred according to the present invention that the zeolitic material is selected from the group consisting of MCM-22, [Ga—Si—O]-MWW, [Ti—Si—O]-MWW, ERB-1, ITQ-1, PSH-3, SSZ-25, and mixtures of two or more thereof, wherein the zeolitic material is more preferably selected from the group consisting of MCM-22, ITQ-1, SSZ-25, and mixtures of two or more thereof. According to the inventive process it is particularly preferred that the zeolitic material of the preferred seed crystals comprises MCM-22 and/or SSZ-25, preferably MCM-22, wherein more preferably MCM-22 is employed as the seed crystals in the mixture prepared in (i) and crystallized in (ii).

Within the meaning of the present invention and unless stated otherwise, the compounds designated as "MCM-22", "ERB-1", "ITQ-1", "PSH-3", and "SSZ-25" respectively stand for the Al-containing form thereof, i.e. Al-MCM-22, Al-ERB-1, Al-ITQ-1, Al-PSH-3, and Al-SSZ-25, respectively. Same applies according relative to the respective layered precursor thereof which, unless stated otherwise, stands for the Al-containing form, i.e. for Al-MCM-22(P), Al-ERB-1(P), Al-ITQ-1(P), Al-PSH-3(P), and Al-SSZ-25 (P), respectively.

Concerning the state in which the mixture prepared in (i) is provided for crystallization in step (ii), no particular restriction applies provided that a zeolitic material having an MWW framework structure comprising $YO_2$ and $B_2O_3$ may be obtained, such that any grade of admixture may in principle be employed to this effect. It is, however, preferred according to the inventive process that in addition to the admixing of the one or more sources for $YO_2$, one or more sources for $B_2O_3$, one or more organotemplates, and seed crystals, the mixture is further homogenized prior to the crystallization in step (ii). According to the inventive process, said preferred homogenization may be achieved by a further mixing step prior to the crystallization in step (ii), wherein preferably said additional mixing includes the grinding and/or milling of the mixture prepared in (i) wherein more preferably the mixture prepared in (i) is homogenized by milling thereof prior to the crystallization in step (ii).

In addition to relating to a process for the preparation of a zeolitic material having an MWW framework structure comprising $YO_2$ and $B_2O_3$ the present invention further relates to the zeolitic material having an MWW framework structure comprising $YO_2$ and $B_2O_3$ as said material is obtained according to any of the particular and preferred embodiments of the inventive process as described in the present application. Furthermore, the present invention also relates to a zeolitic material having an MWW framework structure comprising $YO_2$ and $B_2O_3$ as it may be obtained, i.e. as obtainable, according to any of the particular and preferred embodiments of the inventive process as described herein. In particular, the present invention further relates to a zeolitic material having an MWW framework structure comprising $YO_2$ and $B_2O_3$ as said material may be obtained according to the inventive process, yet independently of the method according to which it has actually been prepared or obtained such that the zeolitic material having an MWW framework structure comprising $YO_2$ and $B_2O_3$ which is obtainable according to the inventive process is not limited to materials having directly been obtained by said process.

Concerning the synthetic boron-containing zeolitic materials of the present invention, no particular restrictions apply relative to their chemical and physical properties provided that they may be obtained according to any of the particular or preferred embodiments of the present invention as defined in the present application. This also applies with respect to the structure of the inventive materials, such that no particular restrictions apply in this respect, provided that the material displays the MWW framework structure.

Applications

The present invention further relates to the use of the aforementioned boron-containing zeolitic material having an MWW framework structure.

In principle, the inventive materials may be used in any suitable application. Thus, by way of example the synthetic boron-containing zeolitic material according to any of the particular and preferred embodiments of the present invention may be used as a precursor for further structural modification, as a catalyst, as a catalyst support, as an adsorbent, as a filler, and/or as a molecular sieve. Preferably, the inventive zeolitic material is used as a molecular sieve, as an adsorbent, more preferably for ion-exchange and/or for separation of gas or liquid mixtures, as a catalyst and/or as a catalyst component, more preferably for hydrocarbon conversion, dehydration, epoxidation, epoxide ring opening, etherification, esterification, ammoxidation, or diesel oxidation catalysis, and more preferably for isomerization, alkylation, or epoxidation. According to the present invention it is particularly preferred that the zeolitic material having an MWW framework structure is used as a catalyst for epoxidation or alkylation, and more preferably for epoxidation. According to the present invention it is further particularly preferred that the zeolitic material having an MWW framework structure as obtainable and/or obtained according to any of the particular and preferred embodiments of the inventive process is used as a catalyst for the epoxidation of propylene to propylene oxide.

The present invention is further characterized by the following preferred embodiments, including the combinations of embodiments indicated by the respective dependencies:

1. A process for the production of a zeolitic material having an MWW framework structure comprising $YO_2$ and $B_2O_3$, wherein Y stands for a tetravalent element, said process comprising
   (i) preparing a mixture comprising one or more sources for $YO_2$, one or more sources for $B_2O_3$, one or more organotemplates, and seed crystals,
   (ii) crystallizing the mixture obtained in (i) for obtaining a layered precursor of the MWW framework structure,
   (iii) calcining the layered precursor obtained in (ii) for obtaining the zeolitic material having an MWW framework structure,
   wherein the one or more organotemplates have the formula (I)

$$R^1R^2R^3N \qquad (I)$$

wherein $R^1$ is $(C_5\text{-}C_8)$cycloalkyl, and
   wherein $R^2$ and $R^3$ are independently from each other H or alkyl, and wherein the mixture prepared in (i) and crystallized in (ii) contains 35 wt. % or less of $H_2O$ based on 100 wt. % of $YO_2$ contained in the mixture prepared in (i) and crystallized in (ii), preferably 30 wt. % or less, more preferably 25 wt. % or less, more preferably 20 wt. % or less, more preferably 25 wt. % or less, more preferably 10 wt. % or less, more preferably 5 wt. % or less, more preferably 3 wt. % or less, more preferably 1 wt. % or less, more preferably 0.5 wt. % or less, more preferably 0.1 wt. % or less, more preferably 0.05 wt. % or less, and more preferably 0.01 wt. % or less based on 100 wt. % of $YO_2$.

2. The process of embodiment 1, wherein the mixture prepared in (i) and crystallized in (ii) contains 5 wt. % or less of fluoride calculated as the element and based on 100 wt. % of $YO_2$, preferably 3 wt. % or less, more preferably 2 wt. % or less, more preferably 1 wt. % or less, more preferably 0.5 wt. % or less, more preferably 0.1 wt. % or less, more preferably 0.05 wt. % or less, more preferably 0.01 wt. % or less, more preferably 0.005 wt. % or less, and more preferably 0.001 wt. % or less or fluoride calculated as the element and based on 100 wt. % of $YO_2$.

3. The process of embodiment 1 or 2, wherein the mixture prepared in (i) and crystallized in (ii) contains 5 wt. % or less of P and/or Al calculated as the respective element and based on 100 wt. % of $YO_2$, preferably 3 wt. % or less, more preferably 2 wt. % or less, more preferably 1 wt. % or less, more preferably 0.5 wt. % or less, more preferably 0.1 wt. % or less, more preferably 0.05 wt. % or less, more preferably 0.01 wt. % or less, more preferably 0.005 wt. % or less, more preferably 0.001 wt. % or less of P and/or Al calculated as the respective element and based on 100 wt. % of $YO_2$.

4. The process of any of embodiments 1 to 3, wherein the layered precursor obtained in (ii) is selected from the group consisting of B-MCM-22(P), B-ERB-1(P), B-ITQ-1(P), B-PSH-3(P), B-SSZ-25(P), and mixtures of two or more thereof, preferably from the group consisting of B-MCM-22(P), B-ITQ-1(P), B-SSZ-25(P), and mixtures of two or more thereof, wherein more preferably the layered precursor comprises B-MCM-22(P) and/or B-SSZ-25(P), preferably B-MCM-22(P), and wherein more preferably the layered precursor obtained in (ii) is B-MCM-22(P).

5. The process of any of embodiments 1 to 4, wherein the zeolitic material having an MWW framework structure obtained in (iii) is selected from the group consisting of B-MCM-22, B-ERB-1, B-ITQ-1, B-PSH-3, B-SSZ-25, and mixtures of two or more thereof, preferably from the group consisting of B-MCM-22, B-ITQ-1, B-SSZ-25, and mixtures of two or more thereof, wherein more preferably the zeolitic material having an MWW framework structure comprises B-MCM-22 and/or B-SSZ-25, preferably B-MCM-22, and wherein more preferably the zeolitic material having an MWW framework structure obtained in (iii) is BMCM-22.

6. The process of any of embodiments 1 to 5, wherein Y is selected from the group consisting of Si, Sn, Ti, Zr, Ge, and combinations of two or more thereof, Y preferably being Si and/or Ti, wherein more preferably Y is Si.

7. The process of any of embodiments 1 to 6, wherein the one or more sources for $YO_2$ comprises one or more compounds selected from the group consisting of silicas, silicates, silicic acid and combinations of two or more thereof, preferably selected from the group consisting of silicas, alkali metal silicates, silicic acid, and combinations of two or more thereof, more preferably selected from the group consisting of fumed silica, colloidal silica, reactive amorphous solid silica, silica gel, pyrogenic silica, lithium silicates, sodium silicates, potassium silicates, silicic acid, and combinations of two or more thereof, more preferably selected from the group consisting of fumed silica, silica gel, pyrogenic silica, sodium silicates, silicic acid, and combinations of two or more thereof, more preferably selected from the group consisting of fumed silica, silica gel, pyrogenic silica, and combinations of two or more thereof, wherein more preferably the one or more sources for $YO_2$ is silica gel, preferably silica gel of the formula $SiO_2 \cdot x\, H_2O$, wherein x is in the range of from 0.1 to 1.165, preferably from 0.3 to 1.155, more preferably from 0.5 to 1.15, more preferably from 0.8 to 1.13, and more preferably from 1 to 1.1.

8. The process of any of embodiments 1 to 7, wherein $R^1$ is selected from the group consisting of substituted and/or unsubstituted cyclopentyl, cyclohexyl, cycloheptyl, and cyclooctyl, more preferably from the group consisting of substituted and/or unsubstituted cyclopentyl, cyclohexyl and cycloheptyl, wherein more preferably $R^1$ is substituted or unsubstituted cyclohexyl or cycloheptyl, more preferably substituted or unsubstituted cyclohexyl, and more preferably unsubstituted cyclohexyl.

9. The process of any of embodiments 1 to 8, wherein $R^2$ and $R^3$ are independently from each other H or $(C_1-C_3)$ alkyl, wherein more preferably $R^2$ and $R^3$ are independently from each other selected from the group consisting of H, methyl, ethyl and propyl, wherein more preferably $R^2$ and $R^3$ are H.

10. The process of any of embodiments 1 to 9, wherein the seed crystals comprise $YO_2$ and $X_2O_3$, wherein X is a trivalent element, wherein independently from one another X is preferably selected from the group consisting of Al, B, In, Ga, and combinations of two or more thereof, X more preferably being Al and/or B, wherein more preferably X is Al, and Y is preferably selected from the group consisting of Si, Sn, Ti, Zr, Ge, and combinations of two or more thereof, Y more preferably being Si and/or Ti, wherein more preferably Y is Si.

11. The process of any of embodiments 1 to 10, wherein the one or more sources for $B_2O_3$ are selected from the group consisting of boric acid, boron oxide, borates, borate esters, and combinations of two or more thereof, preferably selected from the group consisting of boric acid, boron oxide, orthoborates, diborates, triborates, tetraborates, trimethyl borate, triethyl borate, and combinations of two or more thereof, wherein more preferably the one or more sources for $B_2O_3$ are boron oxide and/or boric acid, more preferably boric acid.

12. The process of any of embodiments 1 to 11, wherein the molar ratio $YO_2:B_2O_3$ of the one or more sources of $YO_2$ to the one or more sources for $B_2O_3$ in the mixture prepared in (i) is in the range of from 1:1 to 100:1, preferably from 1.2:1 to 50:1, more preferably from 1.5:1 to 20:1, more preferably from 1.8:1 to 10:1, more preferably from 2:1 to 5:1, more preferably from 2.2:1 to 4:1, more preferably from 2.5:1 to 3.5:1.

13. The process of any of embodiments 1 to 12, wherein the one or more organotemplates are selected from the group consisting of substituted and/or unsubstituted $(C_5-C_8)$ cycloalkylamines, preferably selected from the group consisting of substituted and/or unsubstituted cyclopentylamine, cyclohexylamine, cycloheptylamine, cyclooctylamine, and combinations of two or more thereof, wherein more preferably the one or more organotemplates are substituted and/or unsubstituted cyclohexylamine and/or cycloheptylamine, more preferably unsubstituted cyclohexylamine.

14. The process of any of embodiments 1 to 13, wherein apart from organotemplate optionally contained in the seed crystals, the mixture prepared in (i) does not contain piperidine or hexamethyleneimine, preferably does not contain piperidine and hexamethyleneimine, more preferably does not contain $(C_4-C)$alkyleneimines and $(C_5-C_8)$alkylamines other than the one or more organotemplates according to formula (I), and more preferably does not contain alkyleneimines and alkylamines other than the one or more organotemplates according to formula (I).

15. The process of any of embodiments 1 to 14, wherein the molar ratio organotemplate:$YO_2$ of the one or more organotemplates to the one or more sources for $YO_2$ in the mixture prepared in (i) is in the range of from 0.05:1 to 3:1, preferably from 0.1:1 to 1.5:1, more preferably from 0.2:1 to 0.8:1, more preferably from 0.25:1 to 0.5:1, more preferably from 0.3:1 to 0.4:1, more preferably from 0.32:1 to 0.35:1, more preferably from 0.33:1 to 0.34:1, wherein the one or more organotemplates do not include organotemplate optionally contained in the seed crystals.

16. The process of any of embodiments 1 to 15, wherein the molar ratio $YO_2:B_2O_3$:organotemplate of the one or more sources of $YO_2$ to the one or more sources of $B_2O_3$ to the one or more organotemplates in the mixture prepared in (i) is in the range of 1:(0.01-1):(0.05-3), preferably in the range of 1:(0.02-0.8):(0.1-1.5), more preferably in the range of 1:(0.05-0.7):(0.2-0.8), more preferably in the range of 1:(0.1-0.6):(0.25-0.5), more preferably in the range of 1:(0.2-0.5):(0.3-0.4), more preferably in the range of 1:(0.25-0.45):(0.32-0.35), more preferably in the range of 1:(0.3-0.4):(0.33-0.34), wherein the one or more organotemplates do not include organotemplate optionally contained in the seed crystals.

17. The process of any of embodiments 1 to 16, wherein the mixture prepared in (i) comprises one or more sources for $M_2O$, wherein M stands for one or more alkali metals M, wherein the one or more alkali metals M are preferably selected from the group consisting of Li, Na, K, Rb, Cs, and combinations of two or more thereof, more preferably from the group consisting of Li, Na, Rb and combinations of two or more thereof, wherein more preferably the one or more alkali metals M are Li and/or Na, more preferably Na.

18. The process of embodiment 17, wherein the molar ratio $M_2O:YO_2$ of the mixture prepared in (i) is in the range of from 0.0005:1 to 2:1, preferably from 0.001:1 to 1:1, more preferably from 0.005:1 to 0.5:1, more preferably from 0.01:1 to 0.3:1, more preferably from 0.03:1 to 0.1:1, more preferably from 0.05:1 to 0.08:1, more preferably from 0.06:1 to 0.07:1.

19. The process of embodiment 17 or 18, wherein the molar ratio $YO_2:B_2O_3:M_2O$ of the mixture prepared in (i) is in the range of 1:(0.01-1):(0.0005-2), preferably in the range of 1:(0.02-0.8):(0.001-1), more preferably in the range of 1:(0.05-0.7):(0.005-0.5), more preferably in the range of 1:(0.1-0.6):(0.01-0.3), more preferably in the range of 1:(0.2-0.5):(0.03-0.1), more preferably in the range of 1:(0.25-0.45):(0.05-0.08), more preferably in the range of 1:(0.3-0.4):(0.06-0.07).

20. The process of any of embodiments 1 to 19, wherein the amount of seed crystals in the mixture prepared in (i) is in the range of from 0.05 to 25 weight-% based on 100 weight-% of $YO_2$ in the one or more sources for $YO_2$, preferably from 0.1 to 20 weight-%, more preferably from 0.2 to 15 weight-%, more preferably from 0.5 to 12 weight-%, more preferably from 1 to 10 weight-%, more preferably from 3 to 7 weight-%, more preferably from 4 to 6 weight-%.

21. The process of any of embodiments 1 to 20, wherein the crystallization in (ii) involves heating of the mixture, preferably at a temperature in the range of from 80 to 250° C., preferably from 100 to 230° C., more preferably from 130 to 210° C., more preferably from 150 to 200° C., more preferably from 170 to 190° C., more preferably from 175 to 185° C.

22. The process of any of embodiments 1 to 21, wherein the crystallization in (ii) is conducted under autogenous pressure, wherein crystallization in (ii) is preferably performed in a pressure tight vessel, preferably in an autoclave.

23. The process of any of embodiments 1 to 22, wherein the crystallization in (ii) is carried out for a period in the range of from 1 d to 25 d, preferably from 3 d to 20 d, more preferably from 5 d to 18 d, more preferably from 7 d to 15 d, more preferably from 9 to 12 d, more preferably from 9.5 to 10.5 d.

24. The process of any of embodiments 1 to 23, wherein after (ii) and prior to (iii) the process further comprises
    (a) isolating the layered precursor obtained in (ii), preferably by filtration,
    (b) optionally washing the layered precursor obtained in (a),
    (c) optionally drying the layered precursor obtained in (a) or (b),
    (d) optionally subjecting the layered precursor obtained in (a), (b), or (c) to ion exchange,
    (e) optionally subjecting the layered precursor obtained in (a), (b), (c), or (d) to isomorphous substitution.

25. The process of embodiment 24, wherein in (d) the layered precursor obtained in (a), (b), or (c) is subject to one or more ion exchange procedures with $H^+$ and/or $NH_4^+$, preferably with $NH_4^+$.

26. The process of embodiment 24 or 25, wherein in (d) the ion exchange procedure is repeated from one to five times, preferably from one to four times, more preferably two or three times, wherein more preferably the ion exchange procedure is repeated twice.

27. The process of any of embodiments 24 to 26, wherein in (d) the ion exchange procedure is conducted at a temperature in the range of from 30 to 160° C., preferably from 40 to 140° C., more preferably from 50 to 120° C., more preferably from 60 to 100° C., more preferably from 70 to 90° C., and more preferably from 75 to 85° C.

28. The process of any of embodiments 24 to 27, wherein in (d) the ion exchange procedure is conducted in a solvent system comprising one or more solvents, wherein the one or more solvents preferably comprise water and/or one or more organic solvents, more preferably one or more solvents selected from the group consisting of water, monohydric alcohols, polyhydric alcohols, and combinations of two or more thereof, more preferably selected from the group consisting of water, methanol, ethanol, propanol, butanol, pentanol, ethane-1,2-diol, propane-1,2-diol, propane-1,2,3-triol, butane-1,2,3,4-tetraol, pentane-1,2,3,4,5-pentol, and combinations of two or more thereof, more preferably selected from the group consisting of water, methanol, ethanol, 2-propanol, and mixtures of two or more thereof, wherein more preferably the one or more solvents comprise water, wherein more preferably the ion exchange procedure is conducted in water as the solvent system, more preferably in deionized water.

29. The process of any of embodiments 24 to 28, wherein in (d) the ion exchange is conducted for a duration ranging from 15 min to 6 h, preferably from 30 min to 3 h, and more preferably from 45 min to 1.5 h.

30. The process of any of embodiments 24 to 29, wherein in (e) boron in the framework structure of the layered precursor obtained in (a), (b), (c), or (d) is isomorphously substituted against one or more trivalent and/or tetravalent elements, wherein independently from one another the one or more trivalent elements are preferably selected from the group consisting of Al, Ga, In, and combinations of two or more thereof, and the one or more tetravalent elements are preferably selected from the group consisting of Ti, Ge, Sn, and combinations of two or more thereof, wherein more preferably the layered precursor obtained in (a), (b), (c), or (d) is isomorphously substituted against Al and/or Ti, preferably against Al.

31. The process of any of embodiments 24 to 30, wherein in (e) the one or more trivalent and/or tetravalent elements for isomorphous substitution are provided in the form of one or more salts, preferably in the form of one or more salts selected from the group consisting of halides, sulfates, sulfites, hydroxides, nitrates, nitrites, phosphates, phosphites, acetates, and mixtures of two or more thereof, more preferably in the form of one or more salts selected from the group consisting of chlorides, bromides, sulfates, hydroxides, nitrates, phosphates, acetates, and mixtures of two or more thereof, wherein more preferably the one or more trivalent and/or tetravalent elements for isomorphous substitution are provided in the form of their nitrates.
32. The process of any of embodiments 24 to 31, wherein in (e) isomorphous substitution is conducted in a solvent system comprising one or more solvents, wherein the one or more solvents preferably comprise water and/or one or more organic solvents, more preferably one or more solvents selected from the group consisting of water, monohydric alcohols, polyhydric alcohols, and combinations of two or more thereof, more preferably selected from the group consisting of water, methanol, ethanol, propanol, butanol, pentanol, ethane-1,2-diol, propane-1,2-diol, propane-1,2,3-triol, butane-1,2,3,4-tetraol, pentane-1,2,3,4,5-pentol, and combinations of two or more thereof, more preferably selected from the group consisting of water, methanol, ethanol, 2-propanol, and mixtures of two or more thereof, wherein more preferably the one or more solvents comprise water, wherein more preferably isomorphous substitutions is conducted in water as the solvent system, more preferably in deionized water.
33. The process of any of embodiments 24 to 32, wherein in (e) isomorphous substitution is conducted for a duration ranging from 0.5 to 10 d, preferably from 1 to 8 d, more preferably from 2 to 6 d, more preferably from 2.5 to 5.5 d, more preferably from 3 to 5 d, and more preferably from 3.5 to 4.5 d.
34. The process of any of embodiments 24 to 33, wherein in (d) the ion exchange procedure is conducted at a temperature in the range of from 30 to 160° C., preferably from 50 to 140° C., more preferably from 70 to 120° C., more preferably from 90 to 110° C., and more preferably from 95 to 105° C.
35. The process of any of embodiments 1 to 34, wherein the calcination in (iii) is carried out at a temperature in the range of from 300 to 900° C., preferably from 400 to 700° C., more preferably from 450 to 650° C., more preferably from 500 to 600° C.
36. The process of any of embodiments 1 to 35, wherein after (iii) the process further comprises
    (iv) deboronating the zeolitic material having an MWW framework structure obtained in
    (iii) with a liquid solvent system, thereby obtaining a deboronated zeolitic material having an MWW framework structure.
37. The process of embodiment 36, wherein the liquid solvent system in (iv) is selected from the group consisting of water, monohydric alcohols, polyhydric alcohols, and mixtures of two or more thereof, and wherein said liquid solvent system does not contain an inorganic or organic acid or a salt thereof, the acid being selected from the group consisting of hydrochloric acid, sulfuric acid, nitric acid, phosphoric acid, formic acid, propionic acid, oxalic acid, and tartaric acid.
38. The process of embodiment 36 or 37, wherein the deboronation in (iv) is carried out at a temperature in the range of from 50 to 125° C., preferably from 70 to 120° C., more preferably from 90 to 115° C., more preferably from 90 to 110° C.
39. The process of any of embodiments 36 to 38, wherein the deboronation in (iv) is carried out for a time period in the range of from 6 to 20 h, preferably from 7 to 17 h, more preferably from 8 to 14 h, more preferably from 9 to 12 h.
40. The process of any of embodiments 1 to 39, wherein the seed crystals comprise a layered precursor of a zeolitic material having an MWW framework structure, wherein the layered precursor is preferably selected from the group consisting of MCM-22(P), [Ga—Si—O]-MWW(P), [Ti—Si—O]-MWW(P), ERB-1(P), ITQ-1(P), PSH-3(P), SSZ-25(P), and mixtures of two or more thereof,
    wherein the layered precursor is more preferably selected from the group consisting of MCM-22(P), ITQ-1(P), SSZ-25(P), and mixtures of two or more thereof, wherein more preferably the layered precursor comprises MCM-22(P) and/or SSZ-25(P), preferably MCM-22(P), and wherein more preferably MCM-22(P) is employed as the seed crystals in the mixture prepared in (i) and crystallized in (ii).
41. The process of any of embodiments 1 to 40, wherein the seed crystals comprise a zeolitic material having an MWW framework structure, wherein the zeolitic material is preferably selected from the group consisting of MCM-22, [Ga—Si—O]-MWW, [Ti—Si—O]-MWW, ERB-1, ITQ-1, PSH-3, SSZ-25, and mixtures of two or more thereof,
    wherein the zeolitic material is more preferably selected from the group consisting of MCM-22, ITQ-1, SSZ-25, and mixtures of two or more thereof,
    wherein more preferably the zeolitic material comprises MCM-22 and/or SSZ-25, preferably MCM-22, and wherein more preferably MCM-22 is employed as the seed crystals in the mixture prepared in (i) and crystallized in (ii).
42. The process of any of embodiments 1 to 41, wherein after preparing the mixture in (i) and prior to its crystallization in (ii) the mixture is homogenized, preferably by mixing, and more preferably by grinding and/or milling, more preferably by milling of the mixture prepared in (i).
43. The process of any of embodiments 1 to 42, wherein the seed crystals comprise a layered precursor of a zeolitic material having an MWW framework structure as obtained and/or obtainable in (ii) of the process of any one of embodiments 1 to 42.
44. The process of any of embodiments 1 to 43, wherein the seed crystals comprise a zeolitic material having an MWW framework structure as obtained and/or obtainable according to the process of any one of embodiments 1 to 42.
45. A synthetic zeolitic material having an MWW framework structure obtainable and/or obtained according to the process of any one of embodiments 1 to 44.
46. Use of a synthetic zeolitic material having an MWW framework structure according to embodiment 45 as a molecular sieve, as an adsorbent, preferably for ion exchange and/or for separation of gas or liquid mixtures, as a catalyst and/or as a catalyst component, preferably for hydrocarbon conversion, dehydration, epoxidation, epoxide ring opening, etherification, esterification, ammoxidation, or diesel oxidation catalysis, more preferably for isomerization, alkylation, or epoxidation, and wherein more preferably the zeolitic material having an MWW framework structure is used as a catalyst for epoxidation or alkylation, preferably for epoxidation, and more preferably for the epoxidation of propylene to propylene oxide.

EXAMPLES

Figure 1:
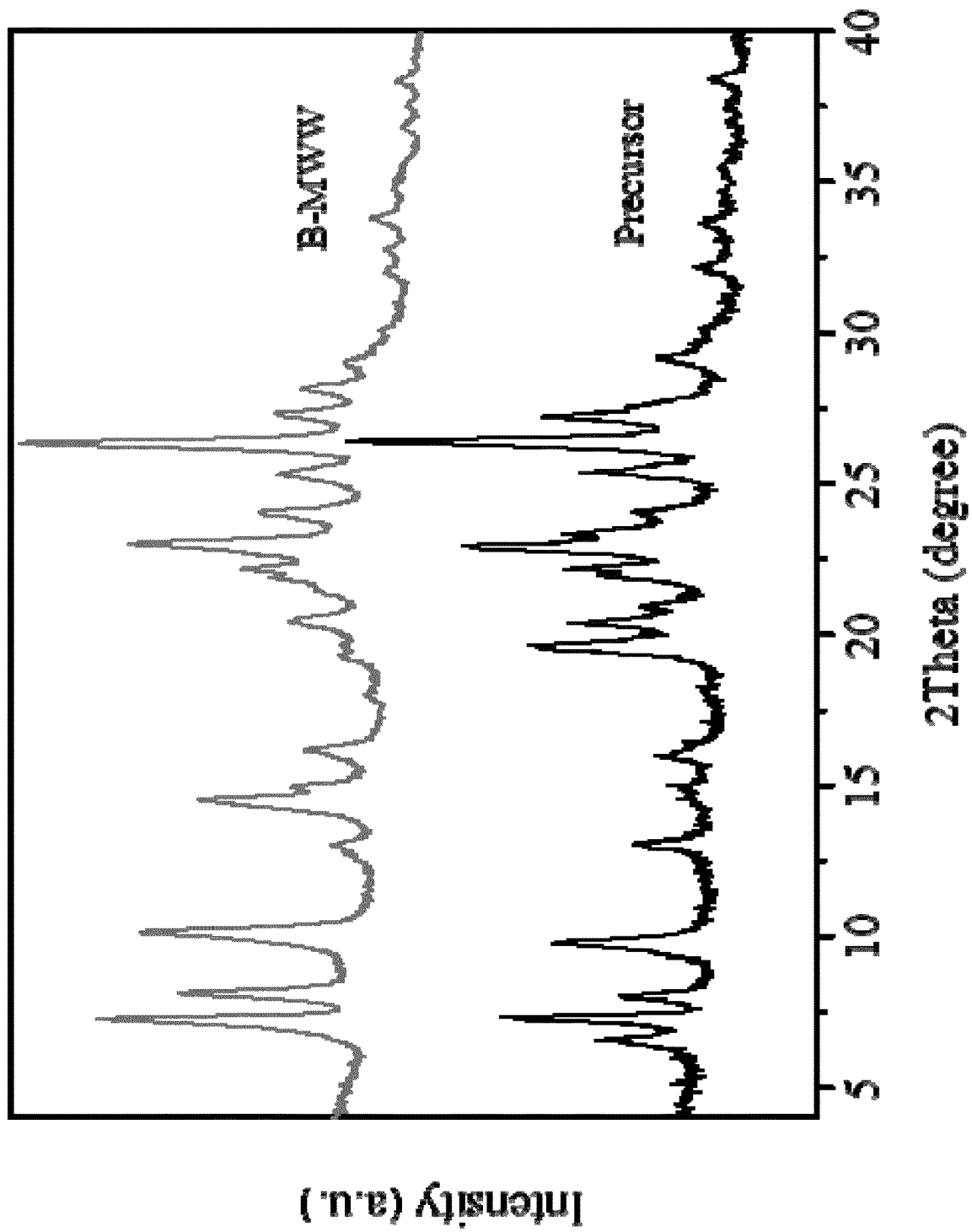
FIG. 1 shows the XRD (X-Ray Diffraction) patterns of the layered precursor B-MWW(P) obtained from Example 1 (cf. lower diffraction pattern) as well as of the B-MWW material obtained from Example 2 after calcination of the layered precursor (cf. upper diffraction pattern). In the figure, the diffraction angle 2 theta in ° is shown along the abscissa and the relative intensities in arbitrary units are plotted along the ordinate.

The crystallinity and phase purity of the samples were determined by X-ray powder diffraction (XRD) with a Rigaku Ultimate VI X-ray diffractometer (40 kV, 40 mA) using CuKα (λ=1.5406 Å) radiation from 3° to 40° with 2θ.

The argon sorption isotherm for determining the BET surface area was carried out with Micromeritics ASAP 2010M and Tristar system.

Solid-state $^{29}$Si MAS NMR spectra were recorded on Varian Infinity plus 400 spectrometer.

$^{11}$B 2D 3QMAS NMR experiments were recorded on a Bruker Infinity Plus 500 spectrometer.

The elemental compositions of the samples were determined by inductively coupled plasma (ICP) with a Perkin-Elmer 3300 DV emission spectrometer.

Reference Example 1: Preparation of the Layered Precursor Al-MWW(P) Used as Seed Crystals 10.40 g of $NaAlO_2$ (43 weight-% $Na_2O$, 53 weight-% $Al_2O_3$) and 6.0 g of NaOH were dissolved in 1239.4 g of deionied water in a 2.5 L glass beaker. To this solution, 259 g of Ludox AS40 (40 weight-% $SiO_2$) and 85.60 g of hexamethyleneimine were then added. The obtained gel has a molar composition of 40.28 $SiO_2$:1.26 $Al_2O_3$:3.43 $Na_2O$:1606$H_2O$:20.13 hexamethyleneimine. Said gel was transferred into a 2.5 L autoclave, and heated up to 150° C. in 1 h under a rotating speed of 100 rpm. The crystallization was then carried out at 150° C. for 168 h.

After the crystallization process, the white suspension obtained was adjusted with an $HNO_3$ solution to reach a pH of about 6.0. Said suspension was then filtered, and washed with deionized water. The solid Al-MWW(P) product was dried at 120° C. for 16 h.

Example 1: Preparation of the Layered Precursor B-MWW(P) Using Al-MWW(P) as Seed Crystals 0.12 g NaOH, 0.88 g orthoboric acid ($H_3BO_3$), 1.72 g solid silica gel ($SiO_2 \cdot 1.16H_2O$ obtained from Qingdao Haiyang Chemical Reagent Co, Ltd.), and 0.065 g Al-MCM-22(P) seed crystals obtained from Reference Example 1 were mixed together. After grinding for 5 min, 0.72 g cyclohexylamine was added and the resulting mixture was ground for another 5 min to afford a gel having the molar composition 0.0665 $Na_2O$:1 ($SiO_2.1.16H_2$):0.328 $B_2O_3$:0.335 cyclohexylamine including 5 wt. % of seed crystals based on 100 wt. % $SiO_2$. Then the powder mixture was transferred to an autoclave and sealed. After heating for 10 days at 180° C., the crystallized product was filtered, washed with deionized water, and dried at 100° C. for 4 h for obtaining the layered precursor B-MWW(P).

FIG. 1 shows the XRD of the resulting material (cf. lower diffractogram displayed in the figure), from which it is apparent that said product has the structure of a layered precursor of the MWW framework structure.

The Si:B molar ratio of the obtained product is 6.7, as measured by ICP analysis.

Figure 2:
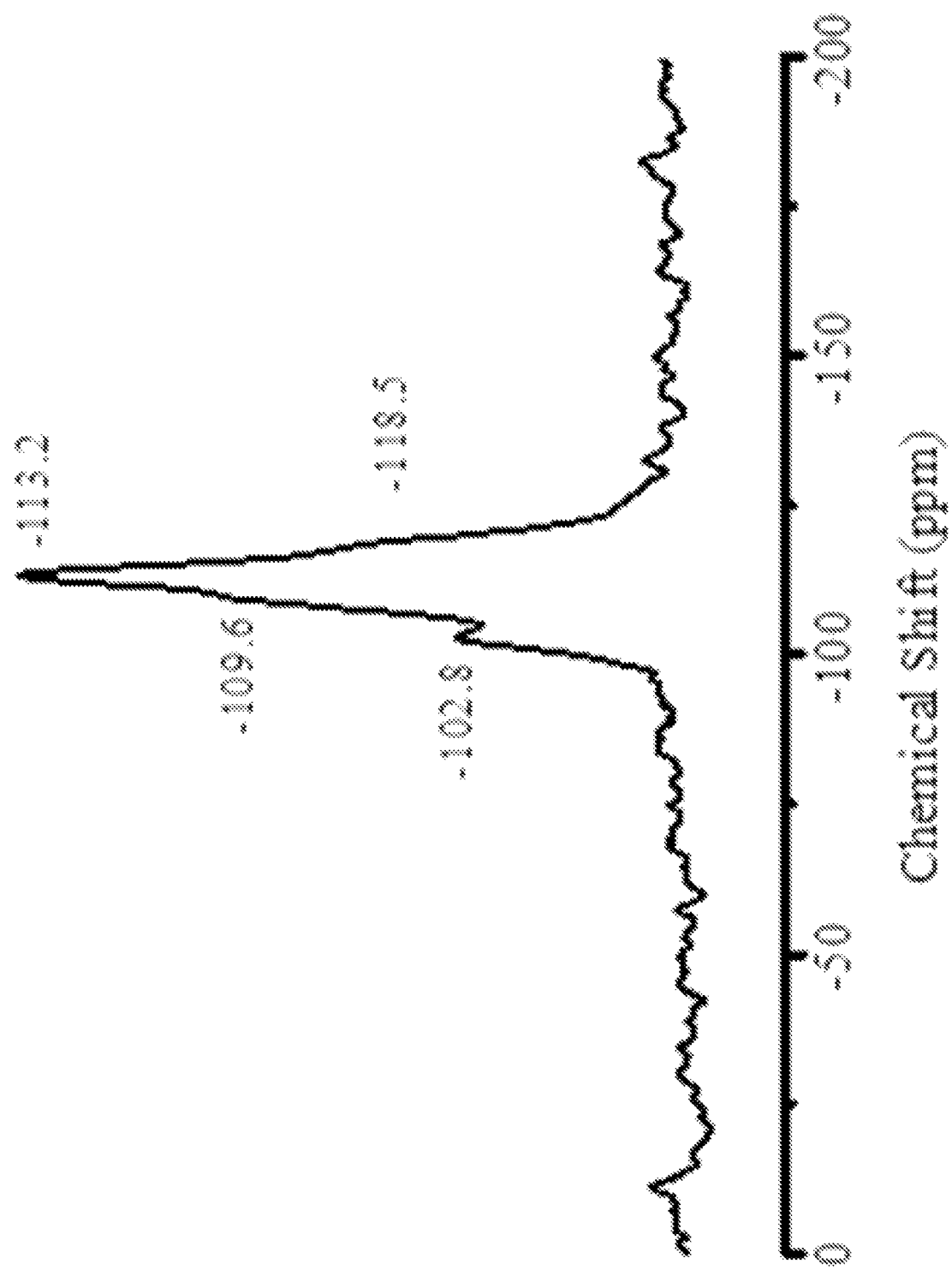
FIG. 2 shows the $^{29}$Si MAS NMR of the layered precursor B-MWW(P) obtained from Example 1. In the figure, the chemical shift in ppm is plotted along the abscissa and the relative intensity is plotted in arbitrary units along the ordinate.

FIG. 2 shows the $^{29}$Si MAS NMR of the layered precursor B-MWW(P). In the spectrum, the peaks of B-MCM-22(P) at −109~−119 ppm are assigned to Si(4Si) species, whereas the peak at about −102.8 ppm is assigned to Si(3Si,1B) and/or Si(3Si,1OH).

Figure 3:
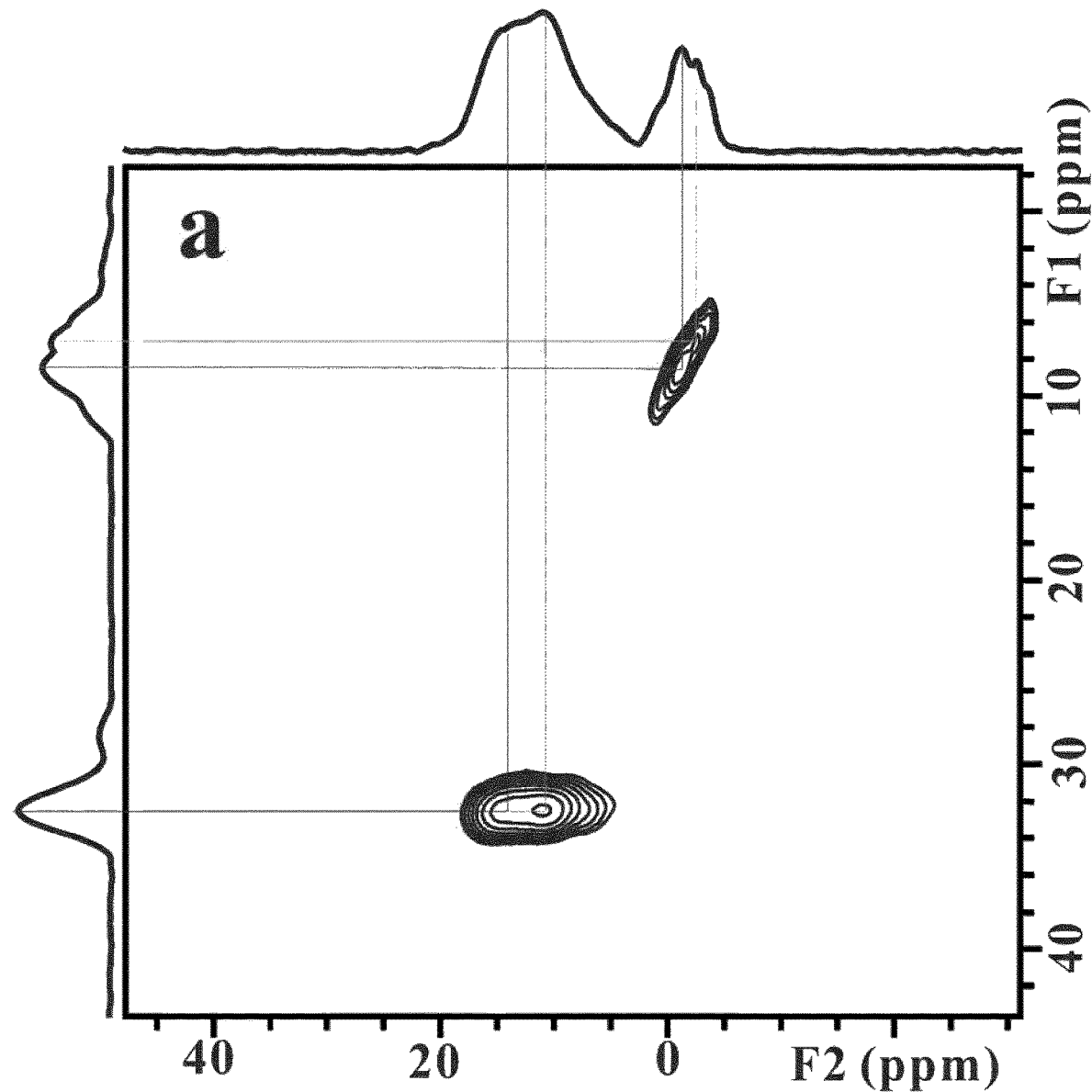
FIG. 3 shows the $^{11}$B 2D 3QMAS NMR of the layered precursor B-MWW(P) obtained from Example 1. In the figure, the isotropic chemical shift in ppm is plotted along the ordinate to the right of the figure whereas the ordinate opposite thereto displays the single dimensional isotropic spectrum. The figure further displays the second-order quadrupolar spectrum along the top of the figure, whereas the respective chemical shift in ppm is plotted along the abscissa opposite thereto. The relative intensities of the respective spectra are displayed in arbitrary units.

FIG. 3 shows the $^{11}$B 2D 3QMAS NMR of the layered precursor B-MWW(P). The 2D 3QMAS spectrum was sheared so that the F1 axis is the isotropic chemical shift dimension and the F2 axis contains the second-order quadrupolar line shape. The 2D contours reveal that there exist two distinct B sites: B[4] species stemming from tetrahedral boron coordination in the framework, and B[3] species stemming from extra-framework boron in trigonal coordination.

Example 2: Preparation of B-MWW from the Layered Precursor 1 g of layered precursor B-MWW(P) as obtained from Example 1 was placed in 50 ml of 1 M $NH_4NO_3$ solution, and the solution was heated to 80° C. for 1 h, after which solid product was isolated. The procedure was repeated twice. The solid product was then calcined at 550° C. for 5 h for obtaining the B-MWW zeolitic material.

FIG. 1 shows the XRD of the resulting material (cf. upper diffractogram displayed in the figure), from which it is apparent that said product has the MWW framework structure.

The BET specific surface area of the B-MWW product was determined to be 391 m²/g.

Figure 4:
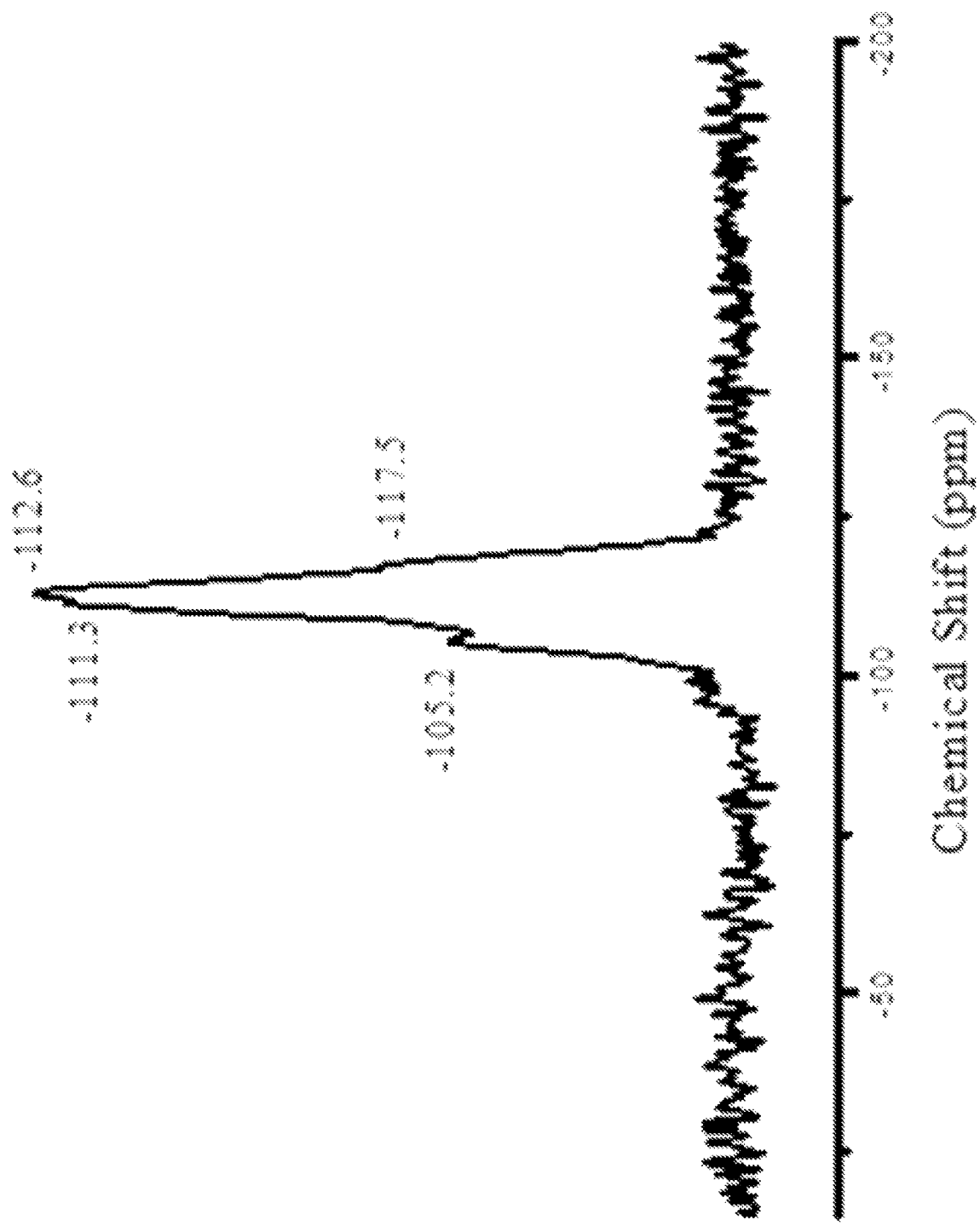
FIG. 4 shows the $^{29}$Si MAS NMR of the B-MWW zeolitic material obtained from Example 2. In the figure, the chemical shift in ppm is plotted along the abscissa and the relative intensity is plotted in arbitrary units along the ordinate.

FIG. 4 shows the $^{29}$Si MAS NMR of the B-MWW product, wherein the peaks are all assigned to Si(4Si) species. In particular, compared to the spectrum of the layered precursor, the peak at about −102.5 ppm assigned to Si(3Si,1B) and/or Si(3Si,1OH) for the layered precursor is shifted to −105.2 ppm after calcination, indicating that the Si(3Si,1OH) species between the layers of the precursor become Si(4Si) species in the B-MWW product due to the condensation of hydroxyl between the layers of the precursor material.

Figure 5:
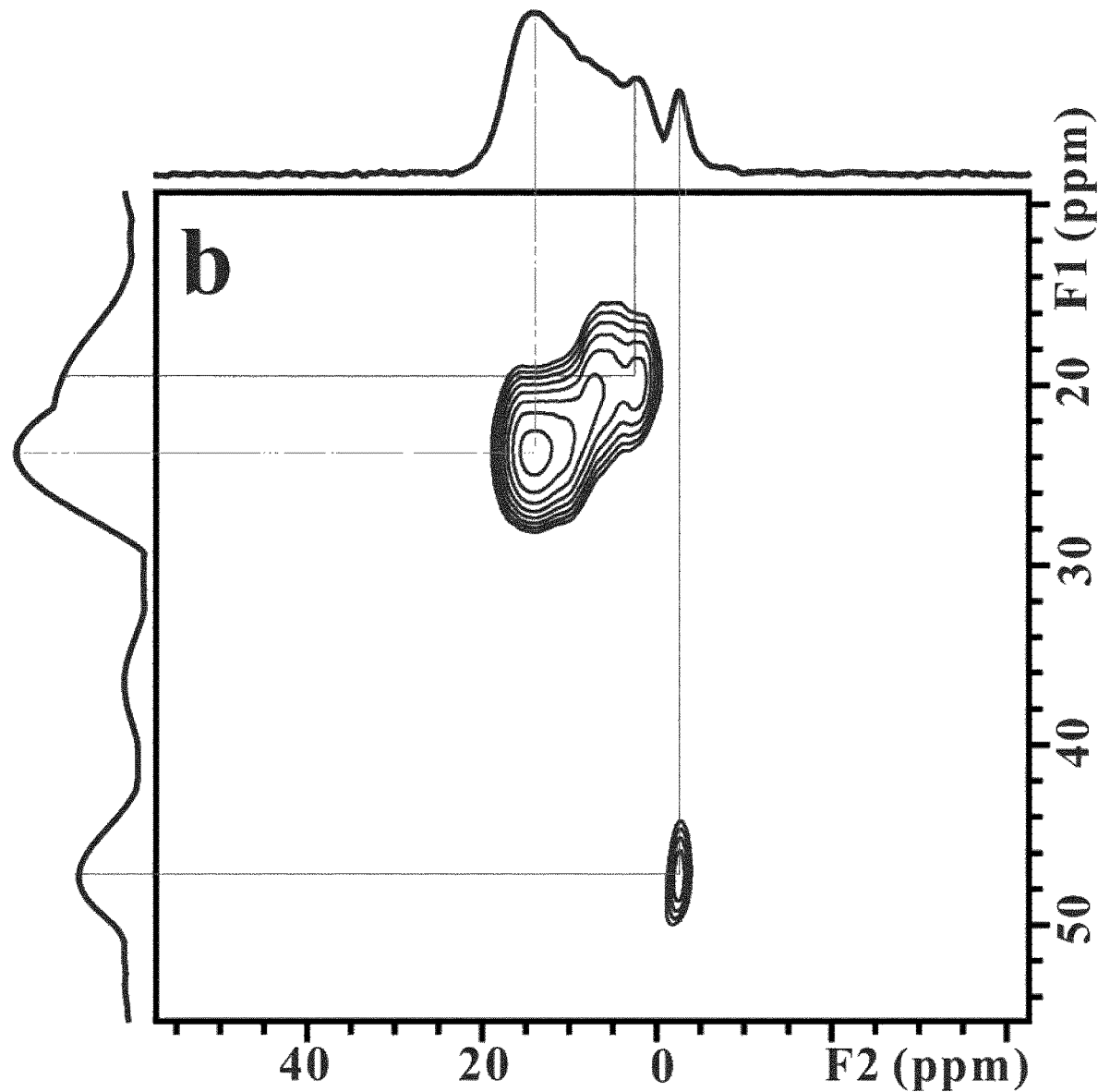
FIG. 5 shows the $^{11}$B 2D 3QMAS NMR of the B-MWW zeolitic material obtained from Example 2. In the figure, the isotropic chemical shift in ppm is plotted along the ordinate to the right of the figure whereas the ordinate opposite thereto displays the single dimensional isotropic spectrum. The figure further displays the second-order quadrupolar spectrum along the top of the figure, whereas the respective chemical shift in ppm is plotted along the abscissa opposite thereto. The relative intensities of the respective spectra are displayed in arbitrary units.

FIG. 5 shows the $^{11}$B 2D 3QMAS NMR of the B-MWW product. The 2D 3QMAS spectrum was again sheared so that the F1 axis is the isotropic chemical shift dimension and the F2 axis contains the second-order quadrupolar line shape. The 'sheared' 2D $^{11}$B MQ-MAS spectrum of the B-MWW zeolite obtained upon calcination clearly shows the presence of three distinct boron signals assigned to boron in tedrahedral ($B_{TET}$), distorted tetrahedral ($B_{D,TET}$), and octahedrally coordinated ($B_{OCT}$) environments, wherein the isotropic $^{11}$B chemical shifts calculated for the resonances are around −4.4 ($B_{OCT}$), 13.3 ($B_{D,TET}$), and 19.0 ($B_{TET}$) ppm. This result clearly indicates that deboronation has occurred to a certain extent upon calcination at 550° C.

Example 3: Isomorphous Substitution of the Layered Precursor of B-MWW with Al 0.2 g of layered precursor B-MWW(P) as obtained from Example 1 placed in 20 g of a 0.15 M Al(NO₃)₃ solution which was then heated to 100° C. for 4 days for isomorphously substituting boron against aluminum. The solid was then isolated for obtaining an isomorphously substituted layered precursor [Al,B]-MCM-22(P). The Si:Al molar ratio of the obtained product is 10.3 and the Si:B molar ratio is 30.7, as respectively measured by ICP analysis.

Figure 6:
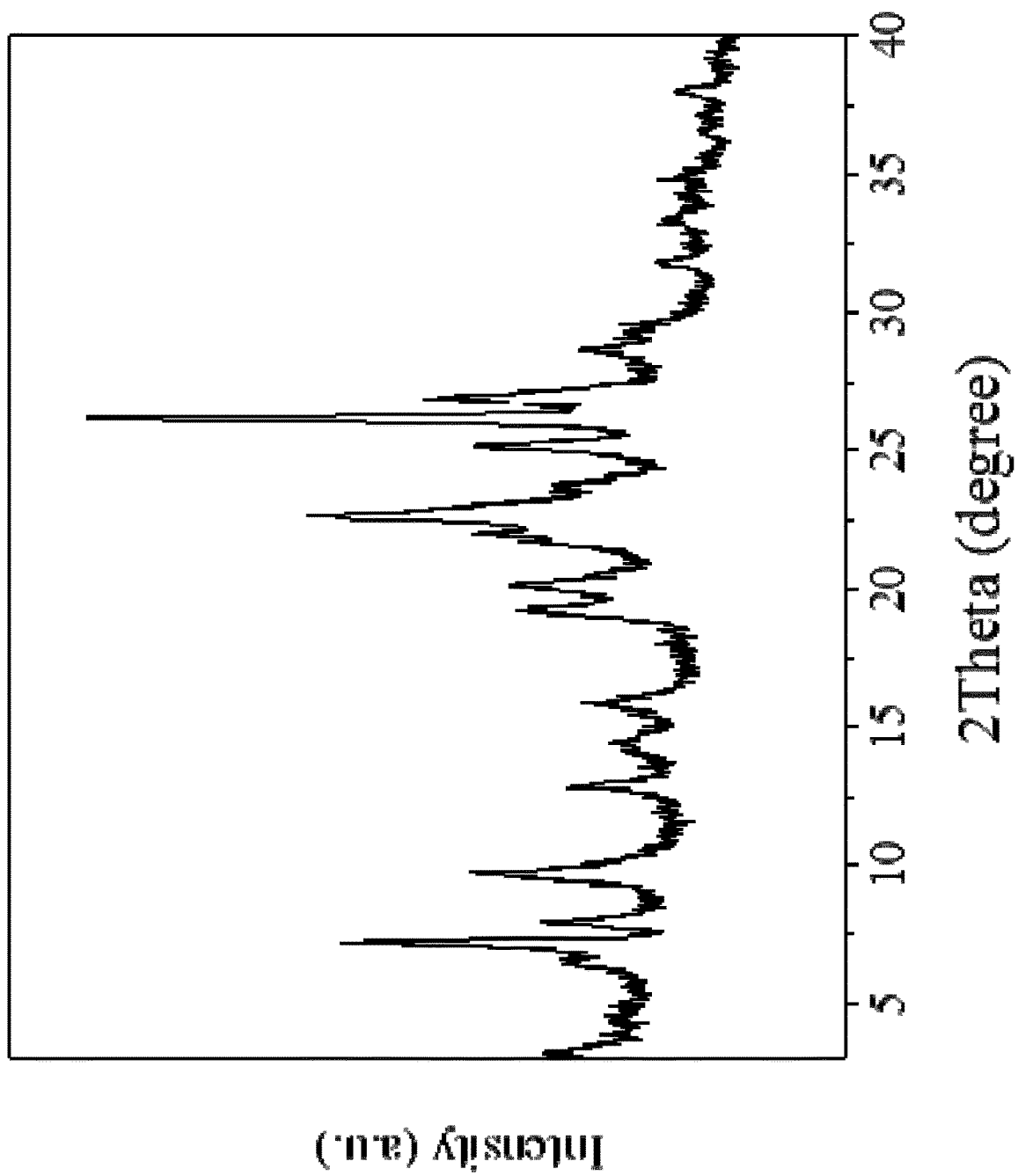
FIG. 6 shows the XRD (X-Ray Diffraction) patterns of the isomorphously substituted layered precursor [Al,B]-MCM-22(P) obtained from Example 3. In the figure, the diffraction angle 2 theta in ° is shown along the abscissa and the relative intensities in arbitrary units are plotted along the ordinate.

FIG. 6 shows the XRD of the resulting material, from which it is apparent that said product has the structure of a layered precursor of the MWW framework structure.

CITED LITERATURE

M. E. Leonowicz et al., Science, vol. 264 (1994), pages 1910-1913
U.S. Pat. No. 5,107,047
U.S. Pat. No. 4,992,615
U.S. Pat. No. 4,954,325 A
U.S. Pat. No. 5,173,281 A
U.S. Pat. No. 5,284,643 A
WO 2015/185633 A
Ren et al., J. Am. Chem. Soc. 2012, 134, 15173-15176
Jin et al., Angew. Chem. Int. Ed. 2013, 52, 9172-9175
Morris et al., Angew. Chem. Int. Ed. 2013, 52, 2163-2165
Wu et al., J. Am. Chem. Soc. 2014, 136, 4019-4025
WO 2014/086300 A
WO 2016/058541 A
Frontera et al., Microporous and Mesoporous Materials 2007, Vol. 106, pp. 107-114

The invention claimed is:

1. A process for producing a zeolitic material having an MWW framework structure comprising YO₂ and B₂O₃, wherein Y is Si, the process comprising:

(i) mixing one or more sources for YO₂, one or more sources for B₂O₃, one or more organotemplates, and seed crystals, to obtain a mixture;
(ii) crystallizing the mixture to obtain a layered precursor of the MWW framework structure; and
(iii) calcining the layered precursor to obtain the zeolitic material having the MWW framework structure,
wherein:
the one or more organotemplates have the formula (I):

$$R^1R^2R^3N \qquad (I)$$

R¹ is cyclohexyl;
R² and R³ are independently from each other H; and
the mixture and the layered precursor comprise 35 wt. % or less of H₂O based on 100 wt. % of YO₂ contained in the mixture and the layered precursor, wherein the mixture prepared in (i) and crystallized in (ii) contains 5 wt. % or less of fluoride calculated as the element and based on 100 wt. % of YO₂.

2. The process of claim 1, wherein the mixture and the layered precursor comprise 3 wt. % or less of fluoride calculated as the element and based on 100 wt. % of YO₂.

3. The process of claim 1, wherein the mixture and the layered precursor comprise 5 wt. % or less of P and/or Al calculated as the respective element and based on 100 wt. % of YO₂.

4. The process of claim 1, wherein the layered is selected from the group consisting of B-MCM-22(P), B-ERB-1(P), B-ITQ-1(P), B-PSH-3(P), B-SSZ-25(P), and mixtures of two or more thereof.

5. The process of claim 1, wherein the zeolitic material having the MWW framework structure is selected from the group consisting of B-MCM-22, B-ERB-1, B-ITQ-1, B-PSH-3, B-SSZ-25, and mixtures of two or more thereof.

6. The process of claim 1, wherein apart from organotemplate optionally contained in the seed crystals, the mixture does not contain piperidine or hexamethyleneimine.

7. The process of claim 1, wherein the crystallization is conducted under autogenous pressure.

8. The process of claim 1, wherein, after the crystallizing and prior to the calcining, the process further comprises:
(a) isolating the layered precursor, to obtain an isolated layered precursor;
(b) optionally washing the isolated layered precursor, to obtain a washed layered precursor;
(c) optionally drying the isolated layered precursor or the washed layered precursor, to obtain a dried layered precursor;
(d) optionally subjecting the layered precursor, the isolated layered precursor, or the washed layered precursor, or the dried layered precursor to ion exchange, to obtain an ion exchanged layered precursor; and
(e) optionally subjecting the isolated layered precursor, the washed layered precursor, the dried layered precursor, or the ion exchanged layered precursor, to isomorphous substitution.

9. The process of claim 8, wherein the isomorphous substitution is performed such that boron in the framework structure of the isolated layered precursor, the washed layered precursor, the dried layered precursor, or the ion exchanged layered precursor, is isomorphously substituted against one or more trivalent and/or tetravalent elements.

10. The process of claim 1, wherein the calcination is carried out at a temperature of from 300 to 900° C.

11. The process of claim 1, further comprising, after the calcining:

(iv) deboronating the zeolitic material having an MWW framework structure with a liquid solvent system, thereby obtaining a deboronated zeolitic material having an MWW framework structure.

12. The process of claim 11, wherein the deboronation is carried out at a temperature of from 50 to 125° C.

13. A synthetic zeolitic material having an MWW framework structure obtained by the process of claim 1.

14. A composition, comprising the synthetic zeolitic material of claim 13, wherein the composition is selected from the group consisting of a molecular sieve, an adsorbent, a catalyst, a catalyst component, and a combination thereof.

* * * * *